United States Patent
Manoh et al.

(10) Patent No.: US 7,333,412 B2
(45) Date of Patent: Feb. 19, 2008

(54) OPTICAL RECORDING/REPRODUCING APPARATUS, FOCUSING METHOD THEREFOR, AND OPTICAL DISK RECORDING MEDIUM

(75) Inventors: Kiyoshi Manoh, Tokyo (JP); Masaomi Nabeta, Tokyo (JP)

(73) Assignee: Sony Corporation, Tokyo (JP)

( * ) Notice: Subject to any disclaimer, the term of this patent is extended or adjusted under 35 U.S.C. 154(b) by 451 days.

(21) Appl. No.: 10/484,713

(22) PCT Filed: Jul. 26, 2002

(86) PCT No.: PCT/JP02/07608

§ 371 (c)(1),
(2), (4) Date: May 21, 2004

(87) PCT Pub. No.: WO03/010761

PCT Pub. Date: Feb. 6, 2003

(65) Prior Publication Data

US 2004/0202084 A1    Oct. 14, 2004

(30) Foreign Application Priority Data

Jul. 26, 2001   (JP)   ............................. 2001-226735
Apr. 17, 2002   (JP)   ............................. 2002-115008

(51) Int. Cl.
G11B 7/08  (2006.01)
(52) U.S. Cl. ................. 369/53.23; 369/53.28; 369/94; 369/44.25; 369/44.27
(58) Field of Classification Search .............. None
See application file for complete search history.

(56) References Cited

U.S. PATENT DOCUMENTS 5,745,450 A  *  4/1998  Miyazono ................. 369/44.27

(Continued)

FOREIGN PATENT DOCUMENTS

EP    1 128 370 A2    8/2001

(Continued)

*Primary Examiner*—Andrea Wellington
*Assistant Examiner*—Michael V Battaglia
(74) *Attorney, Agent, or Firm*—Oblon, Spivak, McClelland, Maier & Neustadt, P.C.

(57) ABSTRACT

A method and apparatus for realizing a stable focus jump operation even in a case where a waveform of an S-curve of a focus error signal fluctuates due to aberration due to fluctuation of a multilayer optical disk substrate thickness or the level of the S-curve fluctuates due to reflectance fluctuation are provided. A focus jump processing means (DSP 51) for performing a focus jump operation moving a laser spot among recording layers of a multilayer optical disk 10 having a plurality of recording layers corresponding to a record/reproduce operation for recording data on the multilayer optical disk 10 or reproducing data recorded on the multilayer optical disk 10 performs acceleration processing for moving the objective lens mounted on an optical pick-up from a certain recording layer of the multilayer optical disk to another recording layer, waiting processing, and deceleration processing for stopping the objective lens 34 and makes an impulse of the acceleration pulse added for the movement of the objective lens 34 in the acceleration processing larger than the deceleration pulse impulse stopping the objective lens 34.

10 Claims, 17 Drawing Sheets

U.S. PATENT DOCUMENTS

| | | | |
|---|---|---|---|
| 5,754,507 A * | 5/1998 | Nishikata | 369/44.29 |
| 5,903,530 A * | 5/1999 | Tateishi et al. | 369/44.27 |
| 6,256,273 B1 * | 7/2001 | Matsuda et al. | 369/44.27 |
| 6,370,093 B1 * | 4/2002 | Tada et al. | 369/44.25 |
| 6,424,605 B1 * | 7/2002 | Iida | 369/44.27 |
| 6,724,697 B2 * | 4/2004 | Lee | 369/44.27 |
| 6,775,208 B1 * | 8/2004 | Liu et al. | 369/44.28 |
| 6,775,209 B2 * | 8/2004 | Kobayashi | 369/44.29 |
| 2001/0008506 A1 | 7/2001 | Takeya et al. | |
| 2002/0101800 A1 * | 8/2002 | Kubota | 369/44.27 |

FOREIGN PATENT DOCUMENTS

| | | |
|---|---|---|
| EP | 1 248 255 A2 | 10/2002 |
| JP | 5-151644 | 6/1993 |
| JP | 8-147762 | 6/1996 |
| JP | 200-155955 | 6/2000 |
| JP | 2001-243637 | 9/2001 |

* cited by examiner

FIG. 8A
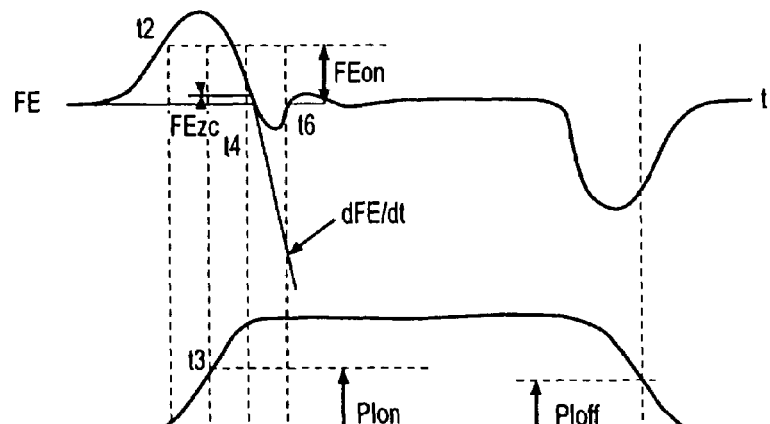
FIG. 8B
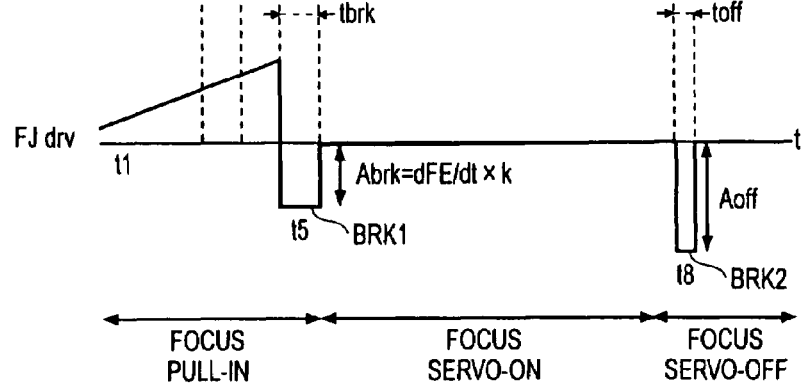
FIG. 8C (CASE WHERE RECORDING LAYER NUMBER IS 3)

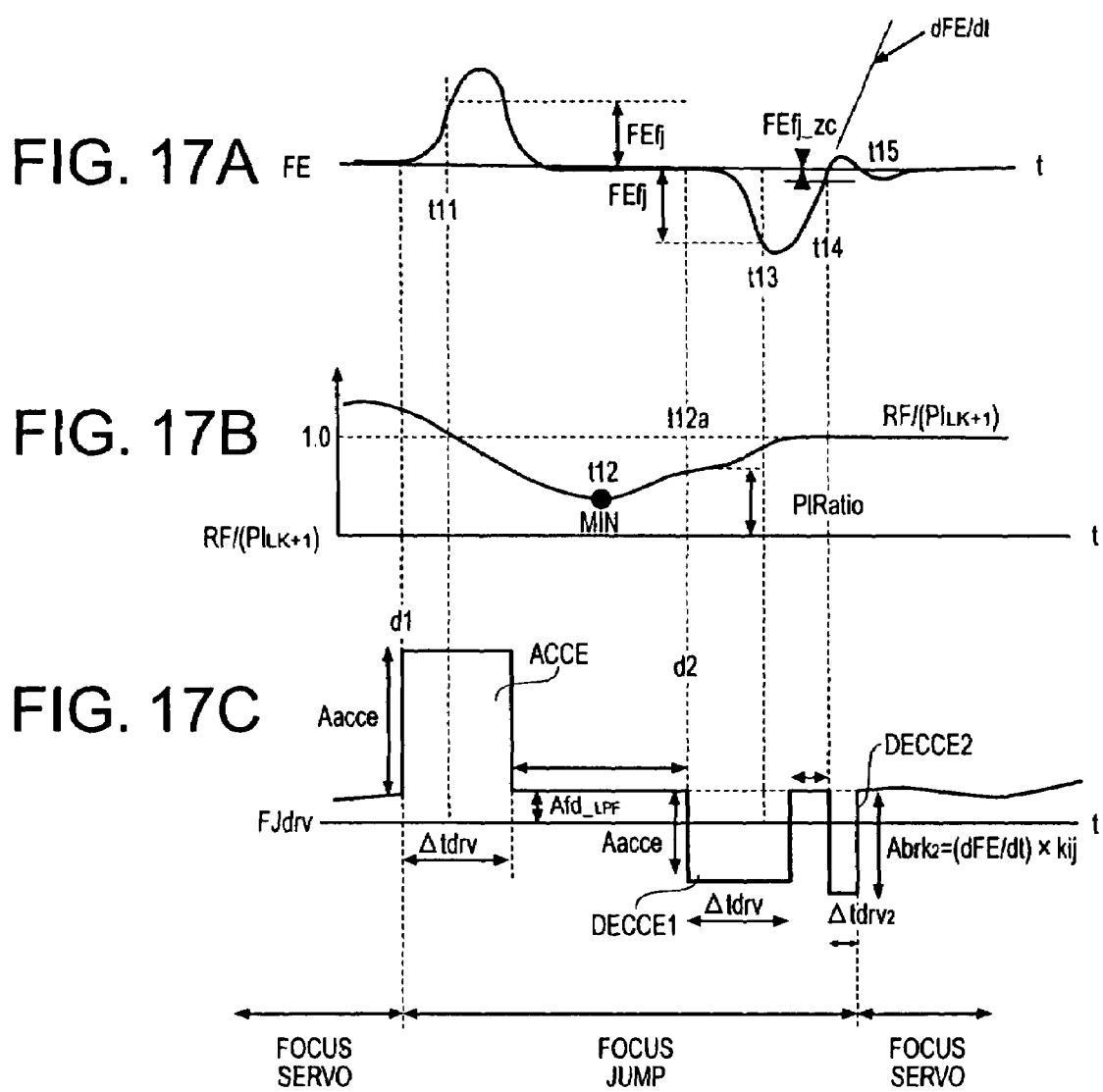

OPTICAL RECORDING/REPRODUCING APPARATUS, FOCUSING METHOD THEREFOR, AND OPTICAL DISK RECORDING MEDIUM

BACKGROUND ART

The present invention relates to an optical disk (disc) recording/reproducing apparatus and method.

Particularly, the present invention relates to technology for reliably and stably performing a focus jump operation for moving among recording layers in an optical disk recording/reproducing apparatus (optical disk drive) able to record/reproduce data on a multilayer optical disk having two or more recording layers.

In an optical disk drive (optical disk recording/reproducing apparatus) able to record/reproduce on a multilayer optical disk having a plurality of recording layers, a focus jump operation is used to move a beam spot among the recording layers. This focus jump operation combines an acceleration pulse and a deceleration pulse to move an objective lens (object lens) to move the beam spot among the recording layers at a high speed. This operation method basically resembles a tracking jump operation moving among tracks in tracking servo control. Note that the jump direction of the focus jump operation is a jump among recording layers in the focus direction and differs from a tracking jump.

A tracking jump operation performed also in an embodiment of the optical disk recording/reproducing apparatus of the present invention will be explained. In the track jump operation, a tracking error signal TE varies in a sine wave state using time as a variable as illustrated in FIG. 1A, so the location of the beam spot with respect to the target track is correctly known and the timing of the acceleration/deceleration can be correctly given.

The pulse waveform illustrated in FIG. 1B shows that, for example, in order to drive a coaxial actuator 35 illustrated in FIG. 4 to move an objective lens 34 toward a target track, a tracking controlling means in a digital signal processor (DSP) 51 gives an acceleration pulse ACCE as a track jump drive signal $TJ_{drv}$ to the coaxial actuator 35 via a tracking driver 52 to accelerate the objective lens 34 moved in the tracking direction by the coaxial actuator, then the tracking controlling means in the DSP 51 gives a deceleration pulse DECCE as a track jump drive signal $TJ_{drv}$ to the tracking driver 57 to decelerate the movement of the objective lens 34 in the tracking direction.

In the focus jump operation for making the beam spot output from the objective lens 34 jump among the plurality of recording layers of the optical disk, as shown in FIGS. 2A and 2B, where making the focus jump from an n-th recording layer nL to an adjacent (n+1)-th recording layer (n+1)L, it is not easy to observe (detect) a change of both of a focus error signal FE and a summation signal RF other than at the vicinity of the recording layer, therefore, other than at the vicinity of the recording layer of the focus jump, it is difficult to accurately determine the timing of the acceleration/deceleration of the coaxial actuator so that the focus jump becomes stable. Therefore, as illustrated in FIG. 2C, the focus jump controlling means gives an acceleration pulse ACCE for driving the coaxial actuator as the focus jump drive signal $FJ_{drv}$ at a time t1, predicts the movement velocity of the objective lens at that time, and gives the deceleration pulse DECCE for driving the coaxial actuator 35 as the focus jump drive signal $FJ_{drv}$ at a time t2 after an elapse of a predetermined time when the focus error signal FE may exceed a threshold value $FE_{th}$. Namely, the focus jump controlling means uses prediction to accelerate and decelerate the coaxial actuator in the vicinity of the target recording layer in the optical disk for the focus jump.

A disk drive (optical disk recording/reproducing apparatus) equipped with a focus jump function for performing the control method by such prediction has already been marketed as a DVD (digital versatile disk)-video player. The technology disclosed in for example Japanese Unexamined Patent Publication (Kokai) No. 10-143872, International Patent Publication No. WO98/05032, etc. has been used.

The technology disclosed in Japanese Unexamined Patent Publication (Kokai) No. 10-143872 uses a technique estimating a movement velocity of the objective lens mounted on an optical pick-up from when the focus error exceeds a certain level on an original recording layer before the focus jump to when it exceeds a certain threshold value on the target recording layer and generating a brake pulse as illustrated in FIGS. 2A to 2C.

In the technique disclosed in Japanese Unexamined Patent Publication (Kokai) No. 10-143872, however, when loading an optical disk having an inter-recording layer distance deviated from a reference in the optical disk recording/reproducing apparatus, an error occurs in the estimated movement velocity of the objective lens, so there is a possibility of the focus jump becoming unstable.

International Patent Publication No. WO98/05032 discloses technology for determining an amplitude of the brake pulse from the maximum value of a differential focus error signal.

In both techniques disclosed in Japanese Unexamined Patent Publication (Kokai) No. 10-143872 and International Patent Publication No. WO98/05032, the reflectance in each recording layer of the optical disk is correctly managed. These are techniques effective in a DVD-video player where a good S-curve is obtained for the focus error in each recording layer of a plurality of recording layers. In a disk drive system increasing the numerical aperture (NA) of the objective lens to achieving a higher density, however, the effect of aberration due to fluctuation of the substrate thickness of the optical disk becomes greater. For example, as illustrated in FIG. 3A, an S-curve having symmetric positive and negative characteristics for the focus error is obtained when the numerical aperture (NA) is small, but the positive and negative characteristics of the S-curve sometimes become asymmetric when the NA is large as illustrated in FIG. 3B. As illustrated in FIG. 3B, when the S-curve becomes asymmetric between positive and negative, the switching timing of the acceleration and deceleration of the coaxial actuator for moving the objective lens 34 in the focus direction cannot be correctly determined.

Further, in a writable optical disk drive for recording/reproducing, the reflectance in each recording layer of the optical disk also fluctuates, so with the method of determining the deceleration timing of the coaxial actuator by referring to the value of the S-curve of the focus error as in the tracking control, there is a possibility that a stable focus jump operation is not possible.

DISCLOSURE OF THE INVENTION

An object of the present invention is to provide an optical disk recording/reproducing apparatus and method using an optical disk having a plurality of recording layers which realizes a stable focus jump operation even in a case when the waveform of the S-curve of the focus error signal fluctuates due to aberration due to fluctuation of the substrate thickness of the optical disk or the level of the S-curve fluctuates due to fluctuation of the reflectance in a plurality of recording layers of an optical disk.

According to a first aspect of the present invention, there is provided an optical disk recording/reproducing apparatus for performing a focus jump operation moving a beam spot among a plurality of recording layers of a multilayer optical disk having a plurality of recording layers corresponding to a record/reproduce operation for recording data on the multilayer optical disk or reproducing data recorded on the multilayer optical disk, comprising: (a) an optical pick-up having an objective lens, a focus actuator for moving the objective lens in a focus direction, a beam emitting means for emitting a beam of light, a light receiving means for receiving light returned from the optical disk, and an optical system for guiding the beam of light from the beam emitting means to the objective lens and guiding the returned light from the optical disk incident upon the objective lens to the light receiving means and (b) a focus drive controlling means for outputting to the focus actuator a focus drive signal for moving the objective lens in a focus direction for positioning the beam spot from the objective lens to a target positioning recording layer of the multilayer optical disk when a focus jump start signal and a target positioning recording layer signal are applied and outputting to the focus actuator a first deceleration pulse by referring to the focus error signal and the summation signal obtained in accordance with the location of the objective lens moved in accordance with the drive of the focus actuator.

According to a second aspect of the present invention, there is provided an optical disk recording/reproducing method for performing a focus jump operation moving a beam spot among a plurality of recording layers of a multilayer optical disk having a plurality of recording layers corresponding to a record/reproduce operation for recording data on the multilayer optical disk or reproducing data recorded on the multilayer optical disk, comprising (a) a step of outputting to the focus actuator a focus drive signal for moving the objective lens in a focus direction for positioning the beam spot from the objective lens to a target positioning recording layer of the multilayer optical disk when a focus jump start signal and a target positioning recording layer signal are applied and (b) a step of outputting to the focus actuator a first deceleration pulse by referring to a focus error signal and a summation signal obtained in accordance with the location of the objective lens moved in accordance with the drive of the focus actuator.

According to a third aspect of the present invention, there is provided an optical disk recording/reproducing apparatus for performing a focus jump operation moving a beam spot among a plurality of recording layers of a multilayer optical disk having a plurality of recording layers corresponding to a record/reproduce operation for recording data on the multilayer optical disk or reproducing data recorded on the multilayer optical disk, comprising (a) an optical pick-up having an objective lens, a focus actuator for moving the objective lens in a focus direction, a beam emitting means for emitting a beam of light, a light receiving means for receiving the light returned from the optical disk, and an optical system for guiding the beam of light from the beam emitting means to the objective lens and guiding the returned light from the optical disk incident upon the objective lens to the light receiving means and (b) a focus drive controlling means for outputting to the focus actuator an acceleration pulse signal for moving the objective lens in a focus direction for positioning the beam spot from the objective lens to a target positioning recording layer of the multilayer optical disk when a focus jump start signal and a target positioning recording layer signal are applied, waiting for exactly a first waiting time, and outputting to the focus actuator a first deceleration pulse signal for stopping the movement of the objective lens.

According to a fourth aspect of the present invention, there is provided an optical disk recording/reproducing method for performing a focus jump operation moving a beam spot among a plurality of recording layers of a multilayer optical disk having a plurality of recording layers corresponding to a record/reproduce operation for recording data on the multilayer optical disk or reproducing data recorded on the multilayer optical disk, comprising (a) a step of outputting to the focus actuator an acceleration pulse signal for moving the objective lens in a focus direction for positioning the beam spot from the objective lens to a target positioning recording layer of the multilayer optical disk when a focus jump start signal and a target positioning recording layer signal are applied; (b) a step of waiting for exactly a first waiting time; and (c) a step of outputting to the focus actuator a first deceleration pulse signal for stopping the movement of the objective lens.

According to a fifth aspect of the present invention, there is provided an optical disk recording/reproducing apparatus for performing a focus jump operation moving a beam spot among a plurality of recording layers of a multilayer optical disk having a plurality of recording layers corresponding to a record/reproduce operation of recording data on the multilayer optical disk and having information of a number of recording layers and a reflectance of each recording layer recorded on one recording layer or reproducing data recorded on the multilayer optical disk, comprising (a) an optical pick-up having an objective lens, a focus actuator for moving the objective lens in a focus direction, a beam emitting means for emitting a beam of light, a light receiving means for receiving the light returned from the optical disk, and an optical system for guiding the beam of light from the beam emitting means to the objective lens and guiding the returned light from the optical disk incident upon the objective lens to the light receiving means; (b) a focus error signal generating means for generating a focus error signal based on a signal from the light receiving means; (c) a summation signal generating means for generating a summation signal based on a signal from the light receiving means; (d) a focus drive controlling means for outputting to the focus actuator an acceleration pulse signal for moving the objective lens in a focus direction for positioning the beam spot from the objective lens to a target positioning recording layer of the multilayer optical disk when a focus jump start signal and a target positioning recording layer signal are applied, waiting for exactly a first waiting time, outputting to the focus actuator a first brake pulse for decelerating the movement of the objective lens when the summation signal indicates a minimum value during the first wait and then the value obtained by dividing the present summation signal by the reflectance information of the recording layer designated by the target positioning recording layer signal recorded in the recording layer of the multilayer optical disk exceeds a threshold value, waiting for exactly a second waiting time, and outputting to the focus actuator a second brake pulse for stopping the movement of the objective lens when an absolute value of the focus error signal indicates the maximum value during the second wait and then crosses zero.

According to a sixth aspect of the present invention, there is provided an optical disk recording/reproducing method for performing a focus jump operation moving a beam spot among a plurality of recording layers of a multilayer optical disk having a plurality of recording layers corresponding to a record/reproduce operation of recording data on the multilayer optical disk and having information of a number of recording layers and a reflectance of each recording layer recorded on one recording layer or reproducing data recorded on the multilayer optical disk, comprising (a) a step of outputting to the focus actuator an acceleration pulse signal for moving the objective lens in a focus direction for positioning the beam spot from the objective lens to a target positioning recording layer of the multilayer optical disk when a focus jump start signal and a target positioning recording layer signal are applied; (b) a step of waiting for exactly a first waiting time; (c) a step of outputting to the focus actuator a first brake pulse for decelerating the movement of the objective lens when the summation signal indicates the minimum value during the first wait and then the value obtained by dividing the present summation signal by the reflectance information of the recording layer designated by the target positioning recording layer signal recorded in the recording layer of the multilayer optical disk exceeds the threshold value; (d) a step of waiting for exactly a second waiting time; and (e) a step of outputting to the focus actuator a second brake pulse for stopping the movement of the objective lens when an absolute value of the focus error signal indicates the maximum value during the second wait and then crosses zero.

According to a seventh aspect of the present invention, there is provided an optical disk recording/reproducing apparatus for performing a focus jump operation moving a laser spot among recording layers of a multilayer optical disk having a plurality of recording layers corresponding to a record/reproduce operation for recording data on the multilayer optical disk or reproducing data recorded on the multilayer optical disk, provided with a focus drive controlling means for applying an acceleration pulse signal to a focus actuator which moves the objective lens in a focus direction for moving a beam spot of the objective lens mounted on the optical pick-up from the recording layer of the multilayer optical disk at which the beam spot is located at present to the designated recording layer and then outputting to the focus actuator a deceleration pulse signal decelerating the movement of the objective lens in the vicinity of the designated recording layer and outputting an impulse of the acceleration pulse signal after making the absolute value larger than the impulse of the deceleration pulse signal.

According to an eighth aspect of the present invention, there is provided an optical disk recording/reproducing apparatus having a focus jump processing means which performs a focus jump operation moving a laser spot among recording layers of a multilayer optical disk having a plurality of recording layers corresponding to a record/reproduce operation for recording data on the multilayer optical disk or reproducing the recorded data, provided with a focus drive controlling means for applying an acceleration pulse signal to a focus actuator for moving the objective lens mounted on the optical pick-up from the recording layer of the multilayer optical disk at which the beam spot is located at present to the designated recording layer, applying a first deceleration pulse signal after that to the focus actuator, and applying a second deceleration pulse signal when the focus error signal becomes not more than a certain level on the recording layer as the target.

According to a ninth aspect of the present invention, there is provided a writable or read only optical disk recording medium formed by laminating a plurality of recording layers, which optical disk recording medium is characterized in that the total number of recording layers of the optical digital recording medium is recorded at a predetermined region of the optical disk.

According to a 10th aspect of the present invention, there is provided a writable or read only optical disk recording medium formed by laminating a plurality of recording layers, in which optical disk recording medium is characterized in that a reflectance when the beam spot is focused to each recording layer is recorded at a predetermined region of the optical disk in advance.

BRIEF DESCRIPTION OF THE DRAWINGS

The above and other object and features of the present invention will be more apparent from the following description given with reference to the accompanying drawings.

FIGS. 8A to 8C are graphs of changes of the focus error, the summation signal, and the focus drive signal in the focus jump (focus pull-in) operation of the first embodiment.

FIGS. 17A to 17C are waveform diagrams of the focus error signal, a value obtained by dividing the present summation signal by the summation signal level in the target recording layer, and the focus jump drive signal in the focus jump operation of the fourth embodiment of the present invention.

BEST MODE FOR CARRYING-OUT THE INVENTION

Figures 1A, 1B:
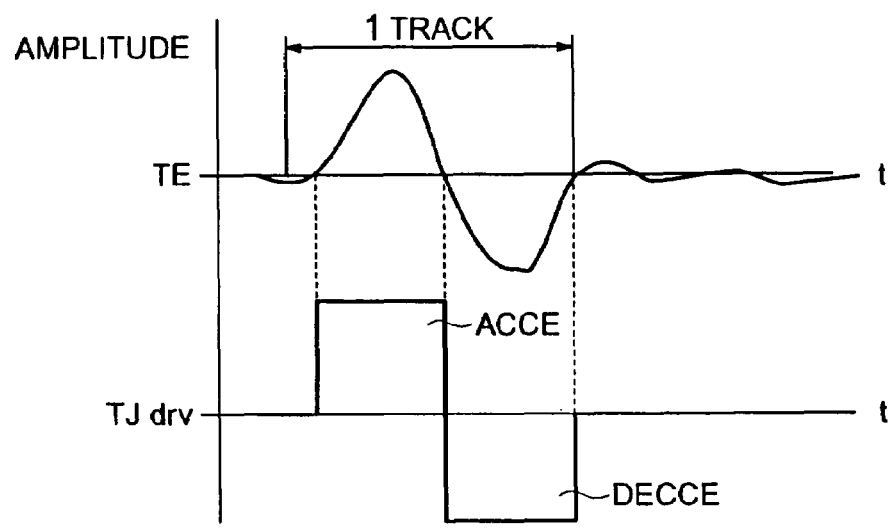
FIGS. 1A and 1B are waveform diagrams of a tracking error signal and a track jump drive signal in a tracking jump operation.
Figures 2A, 2B, 2C:
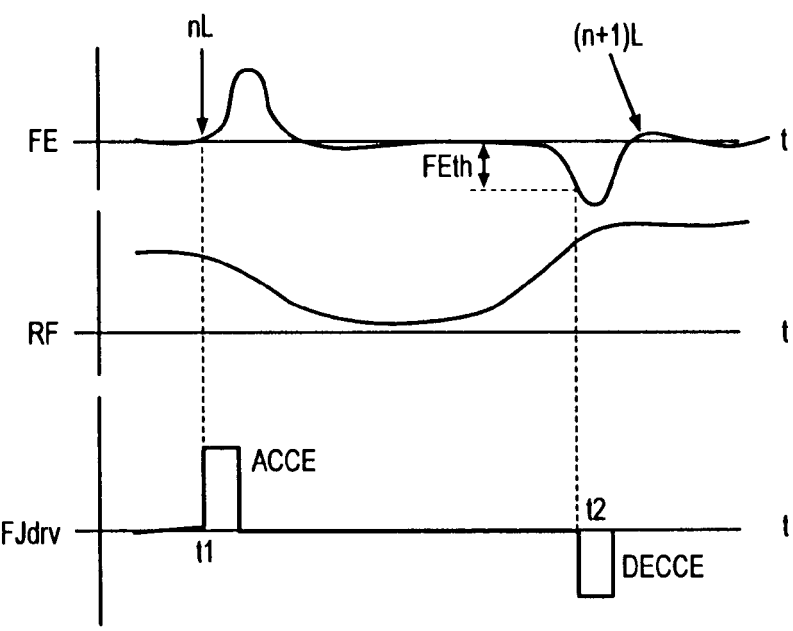
FIGS. 2A to 2C are waveform diagrams of a focus error signal, a summation signal, and a focus jump drive signal in the focus jump operation.
Figure 3A:
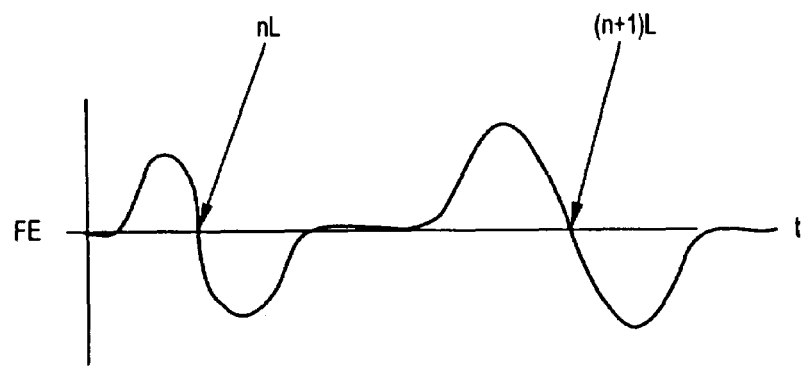
FIGS. 3A and 3B are waveform diagrams of the focus error signal when a numerical aperture is not high and when the numerical aperture is high in the focus jump operation.
Figure 3B:
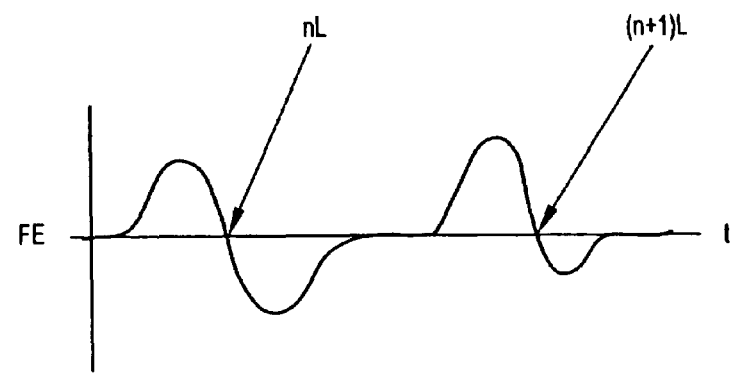

Preferred embodiments of the optical disk (disc) recording/reproducing apparatus and method of the present invention will be explained with reference to the attached drawings.

Basic Items

The basic items and conditions of the optical disk recording/reproducing apparatus and method of the embodiment of the present invention will be explained before describing the preferred embodiments of the present invention.

Condition 1. In order to prevent the influence of S-curve level fluctuation on the focus error signal, the timing of the acceleration and deceleration of the actuator for moving the location of the objective lens (object lens) for the focus jump and the amplitude of the pulse are determined in advance or the level of the summation signal RF is considered.

Further, the impulse to be given to the objective lens by the acceleration pulse is made slightly larger than the impulse of the deceleration pulse. At the time of the end of the deceleration pulse, the beam spot is brought close to the target recording layer (layer) in a state where the speed has sufficiently fallen.

"Impulse" means the value obtained by multiplying the duration of the pulse and the amplitude of the pulse. "Impulse" means the sum of the energy given to the coaxial actuator. Accordingly, "impulse" means the sum of the amounts of movement of the objective lens driven by the coaxial actuator.

Condition 2. In order to bring the movement velocity of the objective lens close to 0 when the focus error becomes a certain level or less (slightly before a focused position), a deceleration pulse (brake pulse) is given to the actuator moving the objective lens.

The impulse of the deceleration pulse (brake pulse) is made a value obtained by dividing the differential of the S-curve for the focus error signal by the level of the summation signal RF, that is, a value proportional to an arrival speed of the beam spot from the objective lens to the target recording layer of the optical disk to which the focus jump must be made. There is a possibility of a slight deviation of the brake pulse from the optimum value due to the influence of aberration etc., but the movement velocity of the objective lens has fallen at that time, so such a deviation can be absorbed by the usual focus servo control performed after the end of the focus jump operation.

According to conditions 1 and 2, in such a high density writable multilayer disk where the inter-layer distance among a plurality of recording layers of the optical disk is deviated from the reference or a constant S-curve cannot be always obtained in the vicinity of each recording layer, the beam spot can be stably moved among the recording layers.

Further, by applying a value proportional to the differential of the focus error signal to the actuator for moving the objective lens as a brake pulse, it is also possible to make the focus pull-in operation stable.

In the present description, an operation of making the beam spot from the objective lens jump from a certain recording layer of the optical disk having multiple recording layers to another recording layer will be referred to as a "focus jump operation", and the time when the beam spot is focused on the target recording layer will be referred to as "focus pull-in completion".

After the focus pull-in, control shifts to the usual focus servo control. The focus servo control is performed by existing circuits and existing methods. Accordingly, in the present description, control for performing the focus jump control and performing the focus pull-in will be mainly explained;

Further, tracking servo control is carried out during the focus jump operation in the optical disk recording/reproducing apparatus of the present invention, but the tracking servo control is not the main theme of the present invention, so a detailed description will be and omitted. In the same way, the track jump operation is carried out by driving a slider motor while performing the focus servo control in the optical disk recording/reproducing apparatus of the present invention, but a detailed description thereof will be omitted.

First Embodiment

A first embodiment of the optical disk recording/reproducing apparatus and method of the present invention will be explained by referring to FIG. 4 to FIGS. 9A to 9D.

Figure 4:
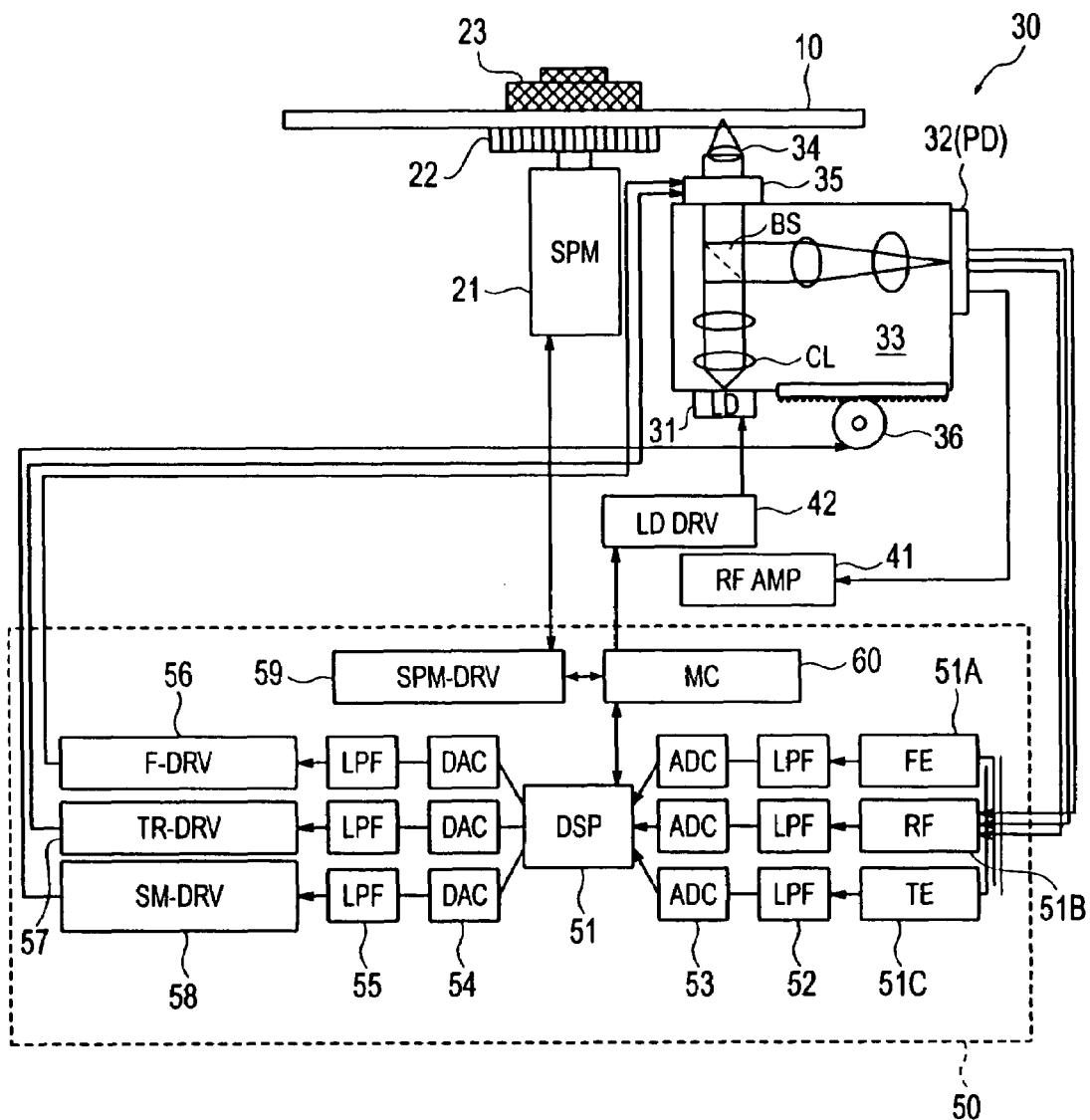
FIG. 4 is a view of the configuration of a multilayer optical disk recording/reproducing apparatus (disk drive) as a basic embodiment of an optical disk recording/reproducing apparatus of the present invention.

FIG. 4 is a view of the configuration of a multilayer optical disk recording/reproducing apparatus (disk drive) of a basic embodiment of the optical disk recording/reproducing apparatus of the present invention.

The optical disk recording/reproducing apparatus has an optical pick-up 30, a servo board 50, a spindle motor 21, a turntable 22, a chucking plate 23, a laser diode (LD) driver 42, and a summation signal amplifier 41.

Figure 5:
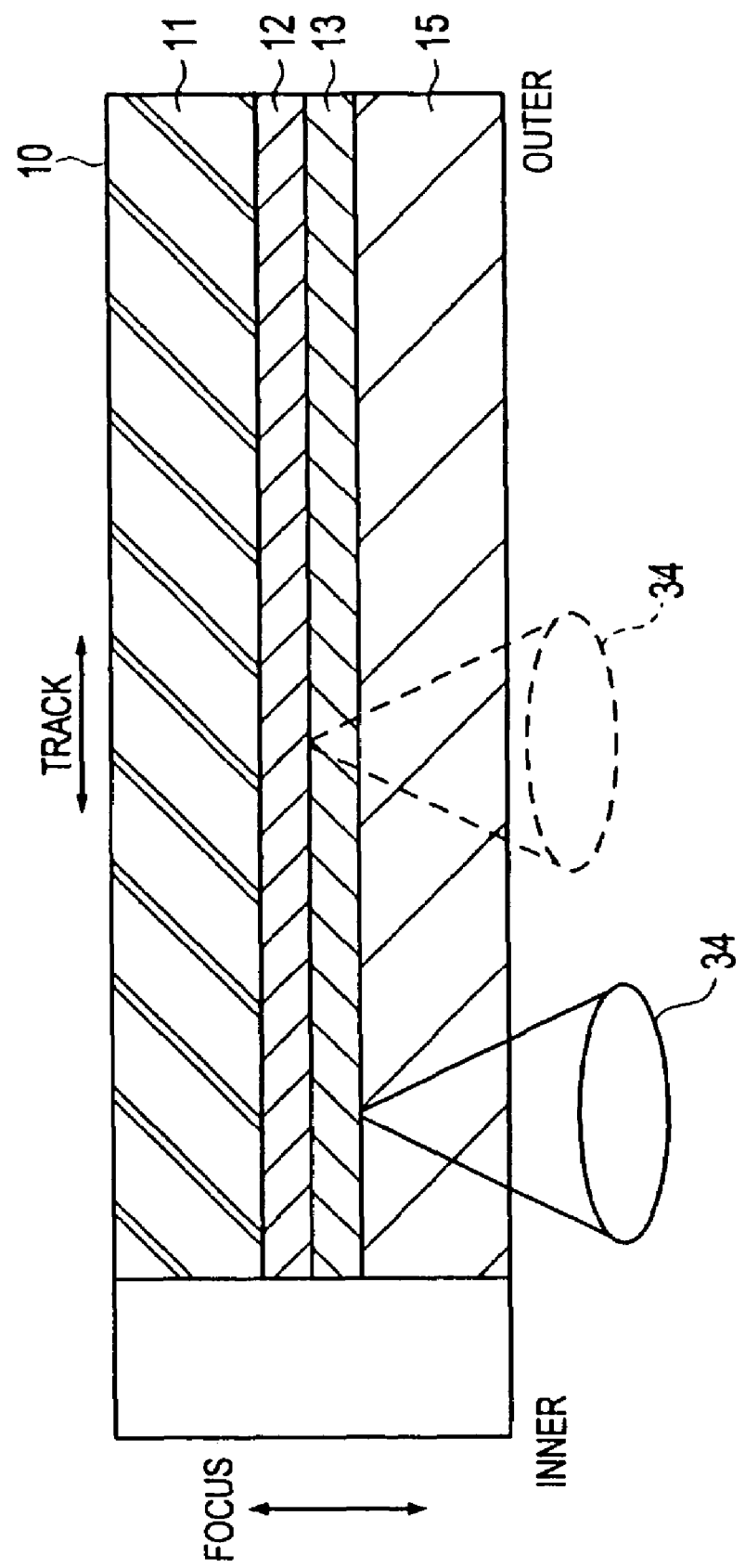
FIG. 5 is a view illustrating a sectional configuration of a multilayer optical disk illustrated in FIG. 4 and a state where a beam spot jumps in focus.

FIG. 5 is a view illustrating the sectional configuration of the multilayer optical disk illustrated in FIG. 4 and a state where the beam spot jumps in focus.

The multilayer optical disk 10 illustrated in FIG. 4 is a two-layer disk having two information recording layers as illustrated in FIG. 5 and has a substrate 11, a second recording layer 12 and a first recording layer 13 formed on the substrate 11, and a light transmitting cover layer 15. FIG. 5 illustrates a state where the beam spot from the objective lens 34 illustrated by a solid line is emitted to the first recording layer 13, and the beam spot from the objective lens 34 jumps in focus to the second recording layer 12 as indicated by a broken line.

The multilayer optical disk 10 is loaded in the turntable 22 attached to the spindle motor 21 and affixed by the chucking plate 23. A control micro-computer 60 performs the record/reproduce of information with respect to the optical disk 10 driven to rotate by the spindle motor 21 via the optical pick-up 30.

The optical pick-up 30 comprises an optical system 33 configured by optical elements such as a laser diode (LD) 31, a photodetector (PD) 32, a beam splitter BS, and a collimator lens CL; an objective lens 34; a coaxial actuator 35 for driving the objective lens 34 in the focus direction and the tracking direction; etc.

Instead of the coaxial actuator 35, it is also possible to configure the actuator separated to a first actuator for driving the objective lens 34 in the focus direction and a second actuator for moving the objective lens 34 in the track direction.

The gist of the present invention resides in that the beam spot from the objective lens 34 is made to jump in focus among the multiple recording layers of the multilayer optical disk 10. The description will be given centered on the drive of the coaxial actuator 35 in the focus direction or the drive of the first actuator.

The optical pick-up 30 is moved in a direction crossing the track of the optical disk 10 by the slide motor 36 driven by the slide motor driver 58 under the control of the digital signal processor (DSP) 51.

The photodetector 32 is for example either of two-part or four-part division photodetectors. The focus error signal FE, the tracking error signal TE, and the summation signal RF are generated from detection signals of the two-part or four-part division detectors.

The servo board 50 is a circuit board on which are mounted a focus error processor 51A, a summation signal processor 51B, a tracking error processor 51C, three first low pass filters (LPF) 52 provided in parallel, three analog/digital conversion circuits (ADC) 53 provided in parallel, a digital signal processor (DSP) 51, three digital/analog conversion circuits (DAC) 54 provided in parallel, three second low pass filters (LPF) 55 provided in parallel, a focus driver 56 for driving the coaxial actuator 35 in the focus direction, a tracking driver 57 for driving the coaxial actuator 35 in the tracking direction, a slide motor driver 57 for driving the slide motor 36, a spindle motor driver 59 for driving the spindle motor 21, and a control micro-computer 60.

The servo board 50 means a board comprised of the above circuit elements mounted on one or more circuit boards. The circuit elements mounted on the servo board 50 do not always have to be mounted on a circuit board and can also be solely independently configured. Conversely, it is also possible to mount the LD driver 42 and the summation signal (RF) amplifier 41 which are not mounted on the servo board 50 on the servo board 50.

The output of the photodetector 32 is supplied to the RF amplifier circuit (RF amplifier) 41 for amplifying the summation signal RF and, at the same time, supplied to the servo board 50. The focus error signal FE is generated from the output of the photodetector 32 input to the servo board 50 by the processing by the focus error processor 51A, the summation signal RF processed by the summation signal processor 51B is generated, and the tracking error processor 51C generates the tracking error signal TE by the processing.

High frequency components of the generated three signals FE, RF and TE are eliminated in the three low pass filters (LPF) 52 provided in parallel, and the low frequency components passed. Further, the passed low frequency components are converted to digital signals in the three AD converters (ADC) 53 provided in parallel, and the converted digital signals are output to the DSP 51 for high speed processing.

Figure 6:
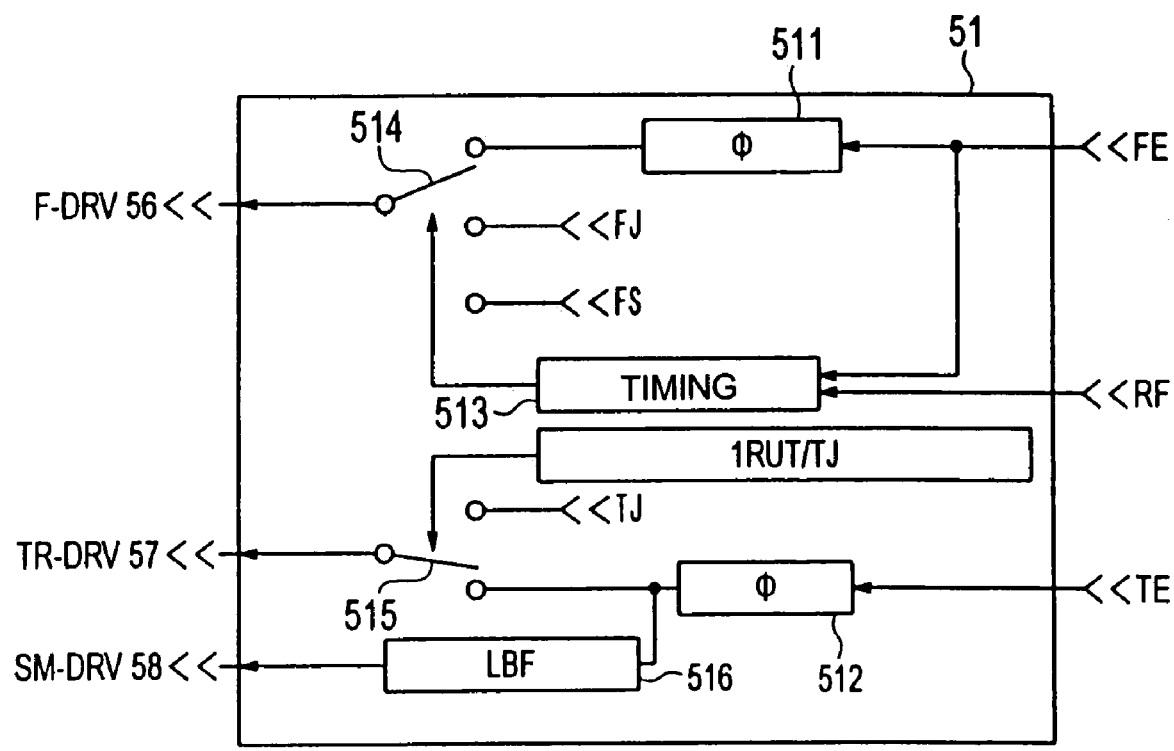
FIG. 6 is a view illustrating phase compensation processing performed by a digital signal processor (DSP) illustrated in FIG. 4 as a block configuration.

The DSP 51 performs control processing for starting the focus jump operation based on a focus jump start command output from the control micro-computer 60 and performs phase compensation (refer to FIG. 9A) with respect to the focus error signal FE and the tracking error signal TE explained by referring to FIG. 6. Preferably, it performs control processing for the focus jump operation in accordance with values of the phase compensated focus error signal RF and the summation signal RF. Namely, the DSP 51 functions as the focus jump processing means of the present invention in addition to functioning as the phase compensation processing means mentioned above. In the present embodiment, the control micro-computer 60 performs the overall control of the optical disk recording/reproducing apparatus. The focus control processing including the focus jump operation and the phase compensation processing for which high speed processing is required are performed by DSP 51.

The three DA converters (DACs) 54 provided in parallel convert the digital output signals of the DSP 51 to analog signals. The low frequency components of the focus error signal FE and the tracking error signal TE which are phase compensated and converted to analog signals are extracted at the corresponding low pass filters (LPFs) among the three LPFs 55 provided in parallel.

The low frequency components of the focus drive signal $F_{drv}$, tracking drive signal $TR_{drv}$, and slide motor drive signal $SM_{drv}$ which are phase compensated at the DSP 51 are applied to the focus driver 56, the tracking driver 57, and the slide motor driver 58, whereby the coaxial actuator 35 and the slide motor 36 are driven.

The coaxial actuator 35 positions the beam spot condensed by the objective lens 34 to the desired recording layer of the optical disk 10 and moves the beam spot to the intended track. The slide motor 36 moves the optical pick-up 30 in the track direction by large increments.

The spindle motor driver 59 causes the spindle motor 21 to rotate under the control of the control micro-computer 60. The rotation of the spindle motor 21 is defined by the optical disk 10, for example, an optical disk of a constant linear velocity system or an optical disk of a constant angular velocity system.

FIG. 6 is a view illustrating the phase compensation processing performed by the digital signal processor (DSP) illustrated in FIG. 4 as a block configuration.

The DSP 51 for performing the phase compensation has a first phase compensating means 511 for the phase compensation for the focus error signal FE, a second phase compensating means 512 for the phase compensation for the tracking error signal TE, and a timing signal generating means 513 for generating a focus on and focus jump timing signal based on the summation signal RF and the focus error signal FE.

The DSP 51 has a first switch 514 for routinely switching among the focus error signal FE phase compensated at the first phase compensating means 511, a focus jump signal FJ, and a focus search signal FS by the timing signal from the timing signal generating means 513 and outputting the same to the DAC connected to the focus driver 56. The DSP 51 has a second switch 515 for routinely switching among the tracking error signal TE phase compensated at the second phase compensation means 512 and the tracking jump signal TJ by a one-rotation signal 1ROT or a track jump command TJ and outputting the same to the DAC connected to the tracking driver 57.

The DSP 51 has a low boost filter (LBF) means 516 for low boost filter processing the tracking error signal TE phase compensated at the second phase compensating means 512 to extract only the low frequency component and outputting the same to the slide motor driver 58.

The output signals of the first switch 514, the second switch 515, and the low boost filter (LBF) means 516 are converted from digital signals to analog signals at the three DA converters (DACs) 54 provided in parallel. The resultant drive signals are passed through the three low pass filters (LPF) 55 provided in parallel, then the low frequency components are sent to the corresponding drivers, that is, the focus driver 56, the tracking driver 57, and the slide motor driver 58. The optical disk 10 is driven to rotate by the spindle motor driver 59 operating under the control of the control micro-computer 60. With the optical disk 10 rotating in this way, the slide motor driver 58 drives the slide motor 36 to move the optical pick-up 30 in the track direction of the optical disk 10, while the focus driver 56 and the tracking driver 57 drive the coaxial actuator 35 for focus servo control and tracking servo control for the beam spot of the objective lens 34.

The control micro-computer 60 instructs the target rotation velocity to the spindle motor driver 59, whereby the rotation velocity of the optical disk 10 is controlled via the spindle motor 21.

The tracking control of the objective lens 34 and the track jump control using the slide motor 36 are not the theme of the present invention, so a detailed description will be omitted. A summary of the tracking control was given referring to FIGS. 1A to 1B.

Figure 7:
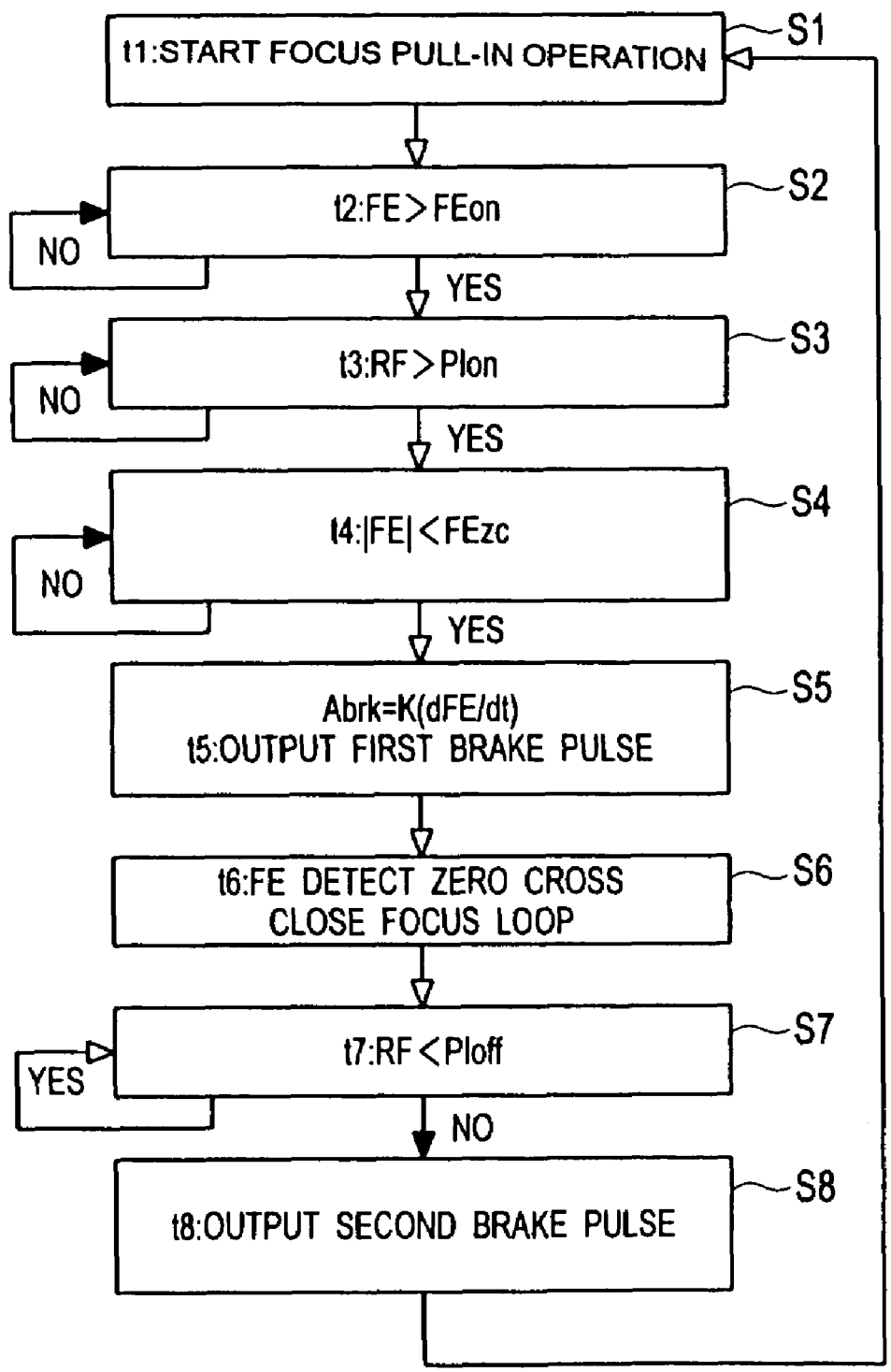
FIG. 7 is a flow chart of focus control processing as a first embodiment of the present invention performed after an optical disk is loaded in a multilayer optical disk recording/reproducing apparatus (disk drive) illustrated in FIG. 4.

FIG. 7 is a flow chart of the focus pull-in (focus jump) operation of a first embodiment performed by the DSP 51 after the optical disk is loaded in the multilayer optical disk recording/reproducing apparatus (disk drive) illustrated in FIG. 4.

FIGS. 8A to 8C are graphs of the changes of the focus error signal FE, the summation signal RF, and the focus jump drive signal $FJ_{drv}$ at the time of focus pull-in of the first embodiment.

Step S1: Start of Focus Jump Operation

When receiving the focus pull-in (focus jump) start command from the control micro-computer 60 at the time t1 of FIG. 8C, the DSP 51 outputs to the focus driver 56 a focus jump drive signal $FJ_{drv}$ increasing by a slope with a constant gradient illustrated in FIG. 8C so that the objective lens 34 gradually approaches the optical disk 10. By this, the focus jump drive signal $FJ_{drv}$ is applied from the focus driver 56 to the coaxial actuator 35, and the coaxial actuator 35 moves the objective lens 34 in the focus direction. The photodetector 32 detects the signal in accordance with the movement of the objective lens 34, the focus error signal generation unit (processor) 51A generates the focus error signal FE illustrated in FIG. 8A from the detection signal of the photodetector 32, the summation signal generation unit (processor) 51B generates the summation signal RF illustrated in FIG. 8B from the detection signal of the photodetector 32, and the tracking error signal generation unit (processor) 51C generates the tracking error signal TE from the detection signal of the photodetector 32.

The gradient of the focus jump drive signal $FJ_{drv}$ is controlled, taking the inertia, response, etc. of the objective lens 34 and the coaxial actuator 35 into account, to a value by which the response is not lowered due to the movement velocity of the objective lens 34 being too slow and the beam spot does not overshoot the target recording layer due to the movement velocity of the objective lens 34 being too fast.

Steps S2 to S5: Focus Jump Processing

When the DSP 51 detects that the focus error signal FE has exceeded a predetermined level FEon at the time t2 of FIG. 8A (S2) and the summation signal RF has exceeded the level PIon at a time t3 of FIG. 8B (S3), then detects that the focus error signal FE crosses zero (ZC) at a time t4 of FIG. 8A and an absolute value thereof becomes smaller than a zero cross threshold value FEzc (S4), the DSP 51 calculates a differential of the focus error signal FE (dFE/dt) at the time t4 and outputs to the focus driver 56 a first brake pulse signal BRK1 (or a first deceleration pulse DECCE1) having an amplitude $Abrk=k \times (dFE/dt)$ (k is a proportional constant) proportional to the differential at a time t5 of FIG. 8C almost the same as the time t4 for a certain time Δtbrk (S5). By this, the movement of the objective lens 34 is stopped.

The first brake pulse signal BRK1 is a signal for stopping the movement of the objective lens 34. It is made a pulse signal of an impulse in accordance with the movement acceleration of the objective lens 34 at that time, so has an amplitude proportional to the differential (dFE/dt) of the focus error signal FE at the time t4.

The polarity of the amplitude of the first brake pulse BRK1 is determined according to which polarity side the focus error signal FE crossed zero from. For example, when the focus error signal FE crosses zero from the positive polarity side toward the negative polarity side, the DSP 51 changes the polarity of the amplitude of the first brake pulse BPK1 to the negative polarity. In this way, the DSP 51 always outputs to the focus driver 56 the first brake pulse BRK1 in a direction decreasing the relative velocity between the objective lens 34 and the optical disk 10 in the focus direction.

When the DSP 51 determines the magnitude and polarity of the amplitude of the brake pulse BRK1 by the above method, the amplitude Abrk of the brake pulse BRK1 will deviate from the optimum point according to the magnitude of the reflectance of the recording layer of the optical disk 10 for applying the focus servo. In order to prevent this, the DSP 51 always gives the optimum brake pulse not depending upon the reflectance of the recording layer of the optical disk 10 by using $Abrk=((dFE/dt)/(PItn)) \times kr$ (kr is a proportional constant where the level of the summation signal RF is used) by taking the level PItn of the summation signal RF into account.

Step 6: End of Focus Jump Operation

Thereafter, when the DSP 51 detects the zero cross at a time t6 during a period where the focus error signal FE of the negative polarity becomes the positive polarity, the DSP 51 assumes that the focus jump processing was terminated, closes the focus loop, and shifts to the focus servo control. By the focus servo control, the objective lens 34 is controlled (maintained) at the focus jumped position.

Steps S7 to S8: After this as well, the DSP 51 monitors the state of the optical disk recording/reproducing apparatus and for example monitors the signal level of the summation signal RF. If a disturbance such as a strong vibration occurs in the disk drive (optical disk recording/reproducing apparatus) and the amount of defocus becomes large and the DSP 51 detects that the summation signal RF indicating synchronization pull-in level state is lower than a level PIoff at a time t7 (S7), the DSP 51 outputs to the focus driver 56 a second brake pulse BRK2 having an amplitude Aoff for exactly a period Δtoff at a time t8 almost the same as the time t7 (S8), moves the objective lens 34 away from the optical disk 10 via the coaxial actuator 35, thereby prevents the objective lens 34 from striking and breaking the optical disk 10. At this time, the focus servo control is forcibly turned off by the DSP 51.

In the above illustration, the time Δtbrk of the first brake pulse BRK1 was made constant and the amplitude Abrk was changed, but it is also possible not to change the amplitude, but to change the output time Δtbrk of the first brake pulse BRK1. In the present embodiment, the DSP 51 controls the product (impulse) of the output time Δtbrk of the brake pulse BRK1 and the amplitude Abrk.

As the value of the impulse (Abrk×Δtbrk), even if both of the amplitude Abrk and the brake time Δtbrk are changed so as to be proportional to the differential of the focus error signal (dFE/dt) when the focus error signal FE becomes lower than the threshold value $FE_{ZC}$ (time t4), effects the same as those described above are obtained.

Modification of First Embodiment

Figure 9A:
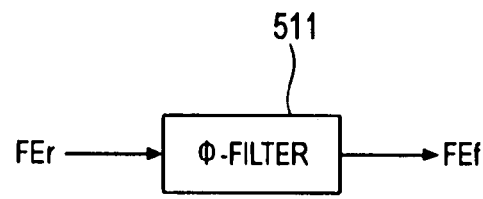
FIG. 9A is a block diagram of a high frequency phase advance compensation filter for compensating the focus error signal in a DSP illustrated in FIG. 4.
Figure 9B:
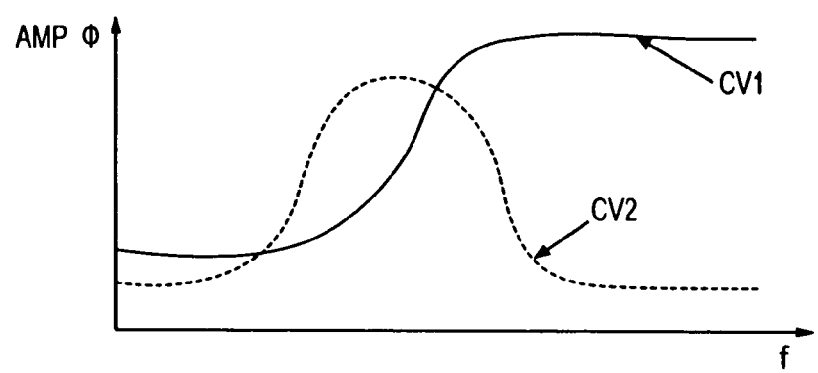
FIG. 9B is a frequency characteristic graph for an amplitude and a phase of the high frequency phase advance compensation filter illustrated in FIG. 9A.
Figure 9C:
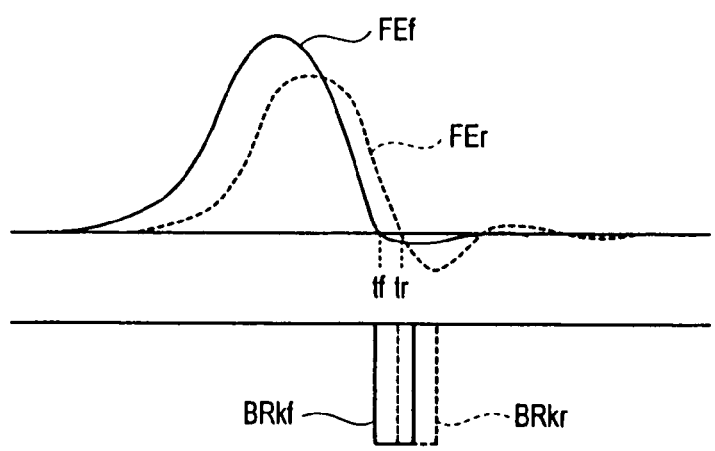
FIG. 9C is a waveform diagram of the focus error (FE) signal in a case where it is not passed through the high frequency phase advance compensation filter of FIG. 9A (broken line) and a case where it is passed through the high frequency phase advance compensation filter (solid line)
Figure 9D:
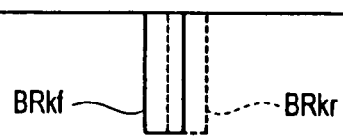
FIG. 9D is a waveform diagram of a brake pulse signal in the case where it is not passed through the high frequency phase advance compensation filter of FIG. 9A (broken line) and the case where it is passed through the high frequency phase advance compensation filter (solid line).

FIG. 9A is a block diagram of a high frequency phase advance compensation filter for compensating for the focus error signal in a DSP illustrated in FIG. 4; FIG. 9B is a frequency characteristic diagram for an amplitude and a phase of the high frequency phase advance compensation filter illustrated in FIG. 9A; FIG. 9C is a waveform diagram of the focus error (FE) signal in a case where it is not passed through the high frequency phase advance compensation filter of FIG. 9A (broken line) and a case where it is passed through the high frequency phase advance compensation filter (solid line); and FIG. 9D is a waveform diagram of a brake pulse signal in the case where it is not passed through the high frequency phase advance compensation filter of FIG. 9A (broken line) and the case where it is passed through the high frequency phase advance compensation filter (solid line).

A raw focus error signal, which is not signal-processed, FEr which is not phase compensated is used for judgment of the zero cross of the focus error signal FE of step 4 at the time t4 in the first embodiment, but as a modification of the first embodiment, if the focus error signal FEf passed through the high frequency phase advance compensation filter 511 in the DSP 51 is used as illustrated in FIG. 9A, there is the advantage that the overshoot at the time of the focus by the focus jump is reduced.

The high frequency phase advance compensation filter 511 illustrated in FIG. 9A outputs the focus error signal FEf after compensation when the raw focus error signal FEr generated at the focus error signal processor 51A is input, but has a frequency characteristic that the phase is advanced in a frequency domain of the S-curve at the time of focus pull-in as indicated as an amplitude characteristic curve CV1 and a phase curve CV2 in FIG. 9B. The zero cross timing tf of the focus error signal FEf after passing through the high frequency phase advance compensation filter becomes earlier than the timing tr when the waveform of the S-curve of the raw focus error signal FEr illustrated in FIG. 9C crosses zero by passing it through the high frequency phase advance compensation filter 511. Accordingly, if the DSP 51 performs the zero cross judgment of the focus error signal FE by using the focus error signal FEf after passing through the high frequency phase advance compensation filter, it can output the brake pulse BRKf at a timing earlier than the output timing of the brake pulse BRKr indicated by the broken line as indicated by the solid line in FIG. 9D, so the overshoot after the focusing is reduced. In this case as well, the differential of the focus error signal FEf after passing through the high frequency phase advance compensation filter having an earlier timing is desirably used for the calculation of the amplitude of the brake pulse BRKf.

The use of the focus error signal FEf after passing through the high frequency phase advance compensation filter explained above can also be applied to the embodiments mentioned below.

In the first embodiment, by using the method of outputting a value proportional to the differential of the focus error signal at the time t4 as the first brake pulse BRK1, the focus pull-in (focus jump) operation can be made stable. Particularly desirably, the zero cross is detected and decided by using the focus error signal FEf after passing through the high frequency phase advance compensation filter for detection at the time t4 explained as a modification of the first embodiment, and the differential of the focus error signal FEf after passing through the high frequency phase advance compensation filter is used for the calculation of the brake pulse BRKf.

In the first embodiment, after the focus synchronization pull-in, when a disturbance occurs, the defocus becomes large, and the synchronization pull-in level becomes lower than the level PIoff of the summation signal RF (S8, t7), by outputting the second brake pulse BRK2 having the amplitude Aoff for exactly the period Δtoff (S8, t8), the objective lens 34 can be prevented from striking the optical disk 10.

As clear from the illustration of FIG. 8C, the impulse of the first brake pulse BRK1 is larger than the impulse of the second brake pulse BRK2 for preventing collision of the objective lens 34 against the optical disk 10. This is because the amount of movement of the objective lens 34 by the first brake pulse BRK1 is larger than the amount of movement of the objective lens 34 for separating the objective lens 34 from the optical disk 10 a little by the second brake pulse BRK2.

Second Embodiment

A second embodiment of the optical disk recording/reproducing apparatus and method of the present invention will be explained next by referring to FIG. 10 and FIGS. 11A to 11C.

Figure 10:
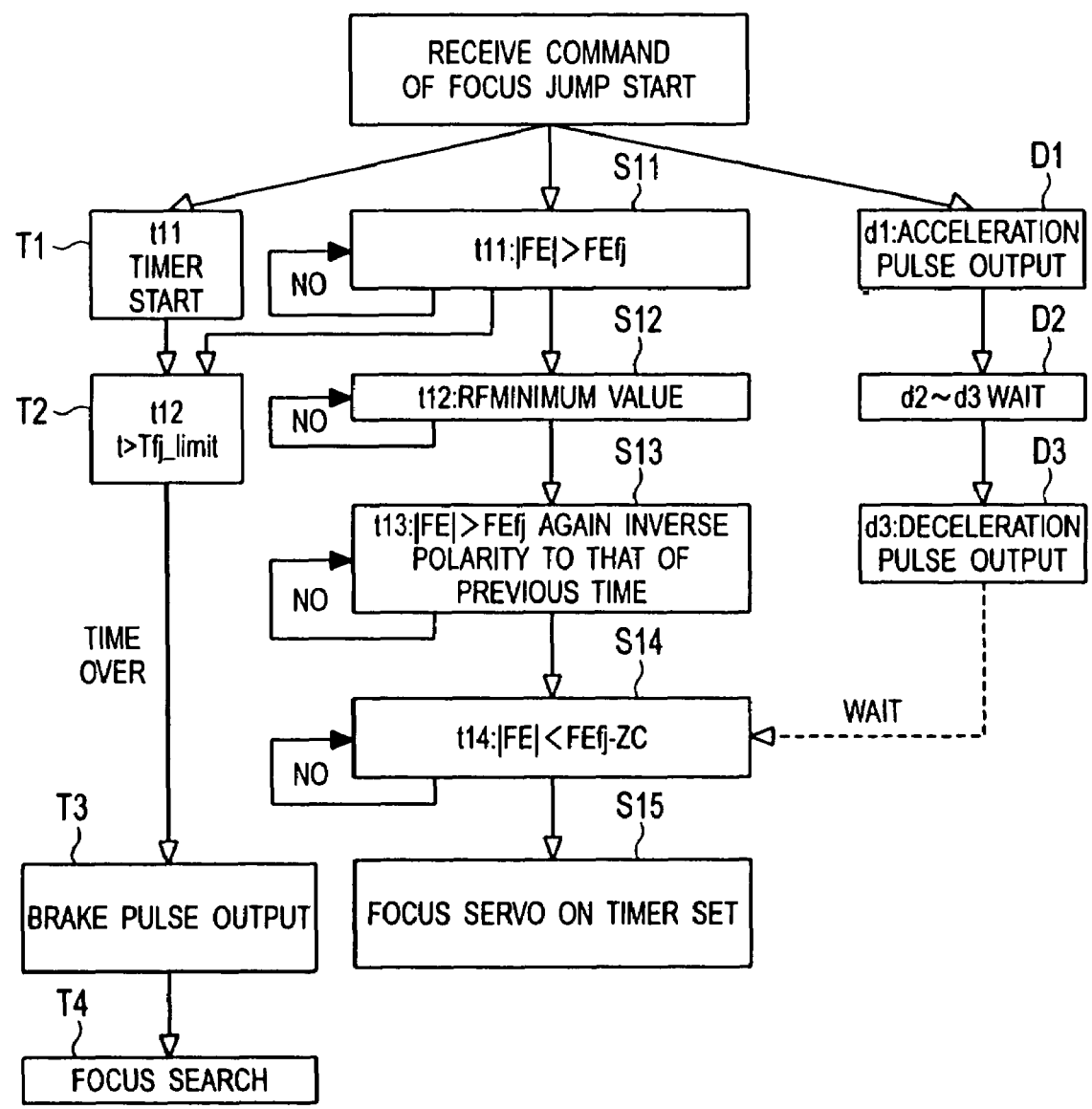
FIG. 10 is a flow chart of focus control processing as a second embodiment of the present invention.

FIG. 10 is a flow chart of the processing from when the focus jump start command is issued from the control microcomputer 60 illustrated in FIG. 4 to the DSP 51 to when the focus jump by the DSP 51 is completed. In FIG. 10, steps D1 to D3 show the operation of the DSP 51 for moving the objective lens 34 in the focus direction by driving the coaxial actuator 35 via the focus driver 56, steps S11 to S15 show the monitor/decision processing by the DSP 51, and steps T1 to T4 show the timer and timing processing by the DSP 51.

Figure 11A:
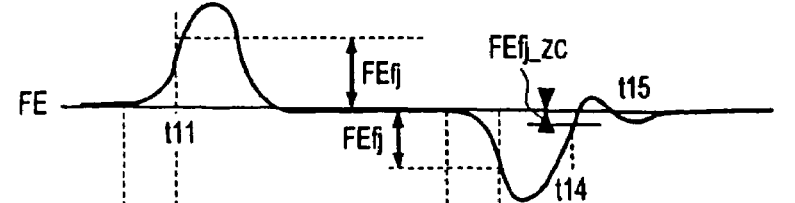
FIGS. 11A to 11C are waveform diagrams of the focus error signal, the summation signal, and the focus jump drive signal in the focus jump operation of a second embodiment.
Figure 11B:
Figure 11C:
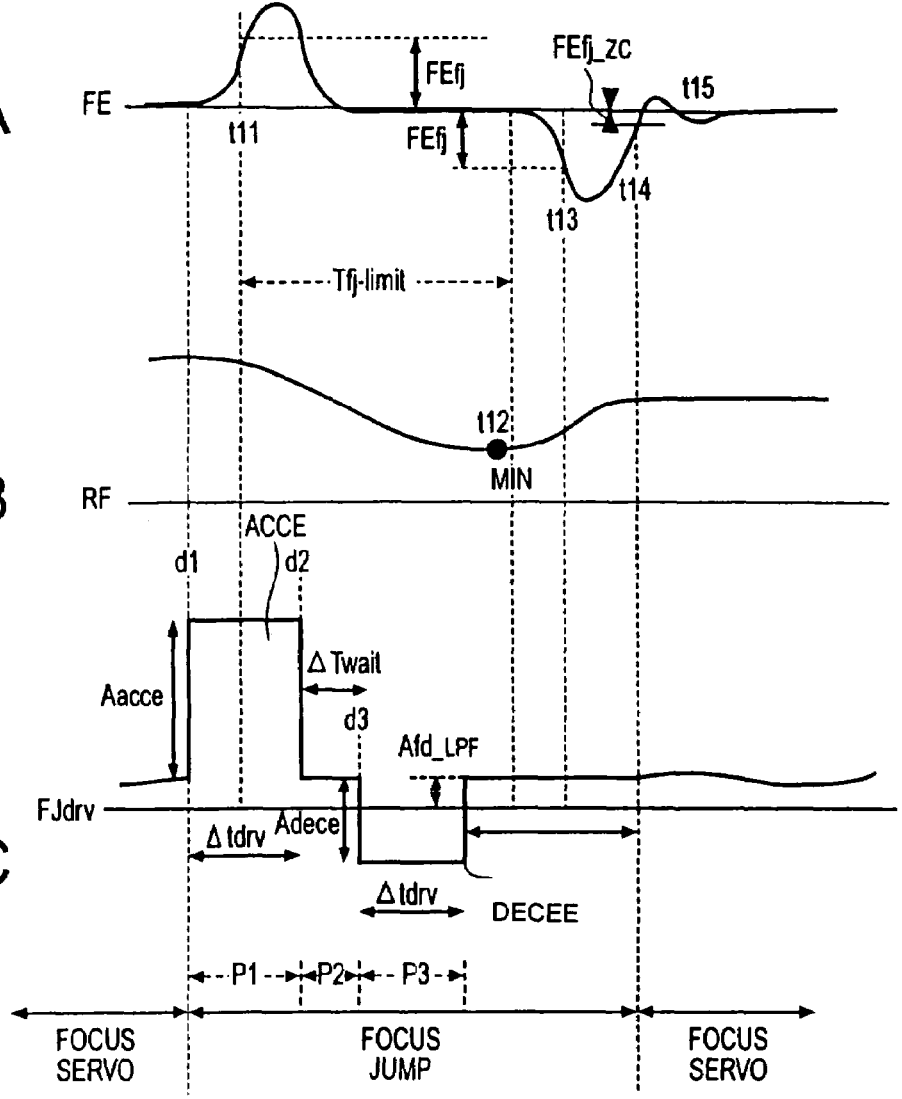

FIGS. 11A to 11C are waveform diagrams of the focus error signal FE, the summation signal RF, and the focus jump drive signal $FJ_{drv}$ in the focus jump operation of the second embodiment.

In the first embodiment, an example of a focus pull-in operation wherein the DSP 51 serving as the focus drive controlling means outputted to the coaxial actuator 35 a signal increasing with a constant gradient via the focus driver 56 as the focus jump drive signal $FJ_{drv}$ and outputted to the coaxial actuator 35 the first brake pulse BRK1 via the focus driver 56 to stop the movement of the objective lens 34 when the beam spot reached the target recording layer was explained, but in the second embodiment, as illustrated in FIG. 11C, the DSP 51 performs an acceleration step (processing) P1 of outputting the acceleration pulse signal ACCE, a waiting step (processing) P2, and a deceleration step (processing) P3 of outputting the first deceleration pulse signal DECCE to the coaxial actuator 35.

According to the second embodiment, it becomes possible to move the beam spot from the present recording layer to the target recording laye at a high speed and stably.

In the second embodiment of the present invention, the DSP 51 illustrated in FIG. 4 always holds a value Afd_LPF of the low frequency component of the signal $FJ_{drv}$ obtained by passing the focus jump drive signal $FJ_{drv}$ through the low pass filter (LPF) 55 in a not illustrated memory of the DSP 51 for the period where the focus servo loop is closed, that is, the period where the focus jump operation is not carried out. The value Afd_LPF of the low frequency component is used as an offset value of the focus jump drive signal $FJ_{drv}$.

When the DSP 51 receives the focus jump start command from the control micro-computer 60, the focus jump processing of the DSP 51 serving as the focus jump means (or focus drive means) starts.

Step D1: The DSP 51 serving as the focus drive controlling means of the present invention outputs to the focus driver 56 as the acceleration pulse ACCE for accelerating the objective lens 34 in the focus direction via the coaxial actuator 35 at a time d1 of FIG. 11C the amplitude of the amplitude Aacce determined in advance and stored in the memory of the DSP 51 plus the value (offset) Afd_LPF of the low frequency component of the focus jump drive signal $FJ_{drv}$ held in the memory and the acceleration pulse ACCE at the time Δtdrv stored in the memory of the DSP 51 (FIG. 11C). By this, the objective lens 34 is moved by the coaxial actuator 35 in the focus direction by an amount corresponding to the value defined by the impulse of the acceleration pulse ACCE.

The offset value Afd_LPF is added to the amplitude Aacce stored in the memory as the acceleration pulse signal ACCE because the objective lens 34 does not move by exactly the intended amount if this offset value is not added.

Note that the present embodiment illustrates a multilayer optical disk 10 having two recording layers, therefore the single type of amplitude Aacce determined in advance and stored in the memory of the DSP 51 is sufficient, but when the multilayer optical disk 10 has three or more recording layers, as the amplitude Aacce stored in the memory, a first amplitude when moving the beam spot in one recording layer and a second amplitude when moving the beam spot between two recording layers are stored in the memory and selectively used in accordance with the amount of movement of the objective lens 34.

Steps D2 to D3: The focus driving means in the DSP 51 continuously outputs to the focus driver 56 only the value Afd_LPF of the low frequency component of the focus jump drive signal $FJ_{drv}$ as the offset value during the waiting time of the time Δtwait at the time d2 after the acceleration pulse ACCE is output for the time Δtdrv (D2, FIG. 11C). The focus jump drive signal $FJ_{drv}$ of the offset value Afd_LPF is output to the coaxial actuator 35 in the waiting time because the waiting state is exhibited in actuality by applying the focus jump drive signal $FJ_{drv}$ of this offset value to the coaxial actuator 35.

At a time d3, the first deceleration pulse DECCE having the amplitude (Adece−Afd_LPF) obtained by subtracting the offset value Afd_LPF from the original amplitude Adece is output for exactly the time Δtdrv (D3).

The DSP 51 outputs the acceleration pulse ACCE and the deceleration pulse DECCE of values obtained by offsetting the output amplitude determined in advance by exactly the offset value Afd_LPF of the low frequency component of the focus jump drive signal $FJ_{drv}$ in all states of the acceleration step P1, waiting time P2, and the deceleration step P3 of the focus jump period illustrated in FIG. 11C.

The offset value Afd_LPF is not limited to one measured during the waiting mentioned above. The low frequency component of the focus error signal FE measured in advance may be used too during focus servo control as explained in the first embodiment.

In the DSP 51, if the amplitude Aacce of the acceleration pulse is set slightly larger than the amplitude Adece of the deceleration pulse so that the impulse given to the objective lens 34 by the acceleration pulse ACCE becomes slightly larger than the impulse of the deceleration pulse DECCE, the laser beam (beam spot) focused in the state where the movement velocity of the objective lens 34 is sufficiently fallen strikes to the target recording layer of the optical disk 10, so the focus jump can be terminated without causing a large overshoot and focus servo control can be switched to.

In the same way as the time of the focus pull-in, the DSP 51 serving as the focus drive controlling means may adjust the impulse by changing the time or amplitude of the acceleration pulse and the deceleration pulse or may adjust both of the amplitude and the time.

Steps S11 to S14: In the same way as the processing of steps S1 to S5 explained by referring to FIG. 7, during the period where the acceleration/deceleration operation is carried out with respect to the objective lens 34 driven by the focus driver 56 and the coaxial actuator 35 in accordance with the acceleration pulse ACCE and the deceleration pulse DECCE output from the DSP 51 illustrated in FIG. 11C, the DSP 51 constantly monitors the focus error signal FE and the summation signal RF (FIG. 11A and FIG. 11B, times t11 to t14) and checks if the beam spot emitted from the objective lens 34 reliably moves among recording layers of the optical disk 10.

Explaining this more concretely, at step S11, the DSP 51 detects if the focus error signal FE becomes larger than the threshold value FEfj at the time t11. Thereafter, the DSP 51 detects the fact that the deceleration pulse DECCE illustrated in FIG. 11C is output after the elapse of the time d2 after the end of the acceleration pulse ACCE illustrated in FIG. 11C and the summation signal RF becomes the minimum value at the time t2 (step S12).

The DSP 51 detects the fact that the absolute value of the focus error signal becomes larger than the threshold value FEfj at step S13, then has the reverse polarity to that of the focus error signal FE at a time t11. Further, at step S4, the DSP 51 decides that the focus jump operation is terminated when detecting that the focus error signal FE shows the maximum value as the absolute value and then changes toward the zero cross and the absolute value of the focus error signal FE becomes smaller than the threshold value FEfj-zc at a time t14, and, at step S15, closes the focus loop and shifts to focus servo control.

Steps T1 to T4 (T1 to T4): At the same time as the start of the focus jump operation, the timer in the DSP 51 is activated, the DSP 51 serving as the focus drive controlling means checks whether or not the operation of the above steps S11 to S14 was carried out in the time TFj_limit determined in advance, and, when the operation has not been terminated, outputs to the focus driver 56 a brake pulse resembling the second brake pulse BRK2 illustrated in FIG. 8C, moves the objective lens 34 away from the optical disk 10 via the coaxial actuator 35, and then returns to the focus search mode.

According to the above method, even in a high density writable multilayer disk where the inter-layer distance of a plurality of recording layers of the optical disk 10 is deviated from the reference or a constant S-curve is not always obtained for the focus error signal in the vicinity of each recording layer, it becomes possible to stably move the beam spot among the recording layers.

Third Embodiment

An optical disk recording/reproducing apparatus and method for the focus jump will be explained next as a third embodiment of the present invention by referring to FIG. 12 and FIGS. 13A to 13C.

Figure 12:
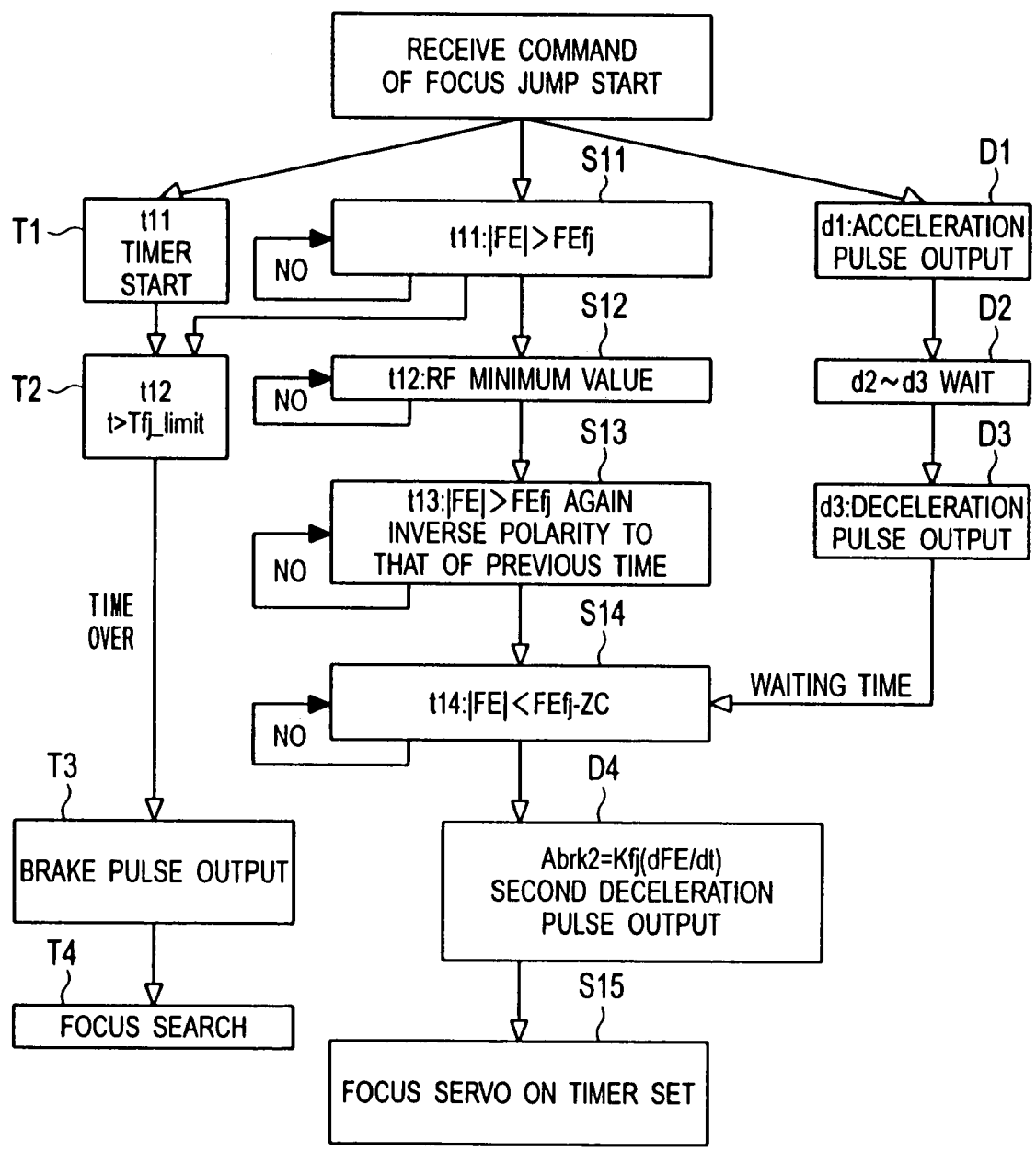
FIG. 12 is a flow chart of focus control processing as a third embodiment of the present invention.

FIG. 12 is a flow chart of the processing until the focus jump is completed according to a third embodiment.

Figure 13A:
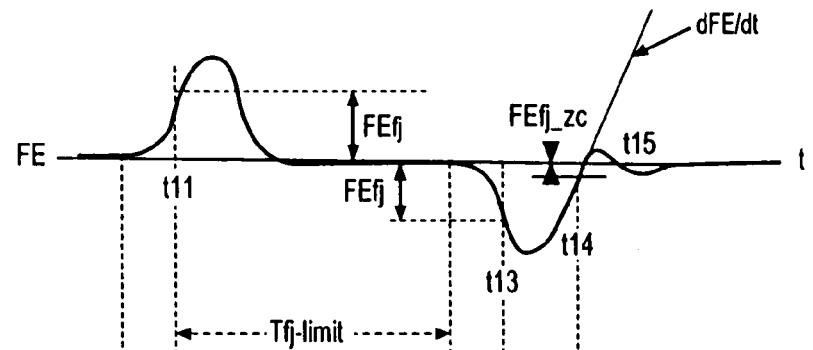
FIGS. 13A to 13C are waveform diagrams of the focus error signal, the summation signal, and the focus jump drive signal in the focus jump operation of the third embodiment.
Figure 13B:
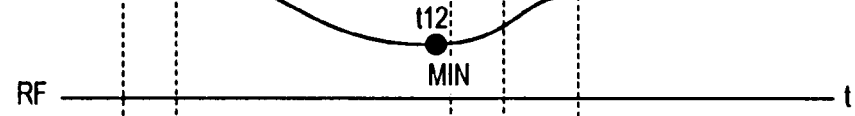
Figure 13C:
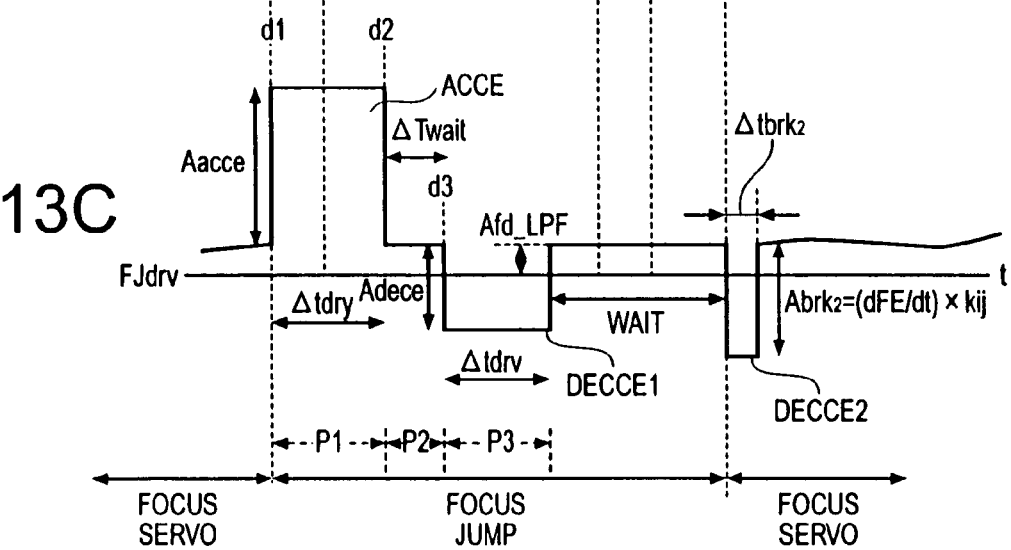

FIGS. 13A to 13C are waveform diagrams of the focus error signal FE, the summation signal RF, and the focus jump drive signal FJdr in the focus jump operation of the third embodiment.

In FIG. 12, in the same way as FIG. 10, steps D1 to D4 show the operation of the DSP 51 for driving the coaxial actuator 35 via the focus driver 56 and moving the objective lens 34 in the focus direction, steps S11 to S15 show the monitor/decision processing by the DSP 51, and steps T1 to T4 show the timer and timing processing by the DSP 51.

The processings of steps S11 to S14, steps D1 to D3, and steps T1 to T4 in the third embodiment of the present invention illustrated in FIG. 12 are the same as those of the second embodiment explained by referring to FIG. 10.

The difference of the third embodiment from the second embodiment explained by referring to FIG. 10 resides in that, when the DSP 51 judges zero is crossed since the focus error signal FE becomes lower than the threshold value (setup value) FEfj-zc at step S14 of FIG. 12, it does not immediately close the focus loop as in the second embodiment to terminate the focus jump operation and shift to the focus servo control, but adds the processing of step D4 at a time t14, outputs the second deceleration pulse DECCE2 having the amplitude Abrk2=dFE/dt×kfj proportional to the differential dFE/dt of the focus error signal FE to the focus driver 56 during a short time Δtbrk2, drives the coaxial actuator 35, and stops the movement of the objective lens 34.

Thereafter, at step S15, the DSP 51 closes the focus loop and shifts to the focus servo control.

In the third embodiment as well, the method of calculation of the amplitude Abrk2 of the second deceleration pulse DECCE2 using the level of the summation signal RF at a time t14 of FIG. 13A is exactly the same as the case of the first embodiment. The differential (dFE/dt) of the focus error signal at a time t14 is divided by the level PILn of the summation signal RF. This value is multiplied by the proportional coefficient kfj_PI to obtain Abrk2=((dFE/dt)/(PILn))×kfj_PI. By using this, stable focus jump free from influence of the reflectance of the recording layer of the optical disk 10 becomes possible.

Modification of Third Embodiment

In the third embodiment as well, as explained in the modification of the second embodiment, it is possible to reduce the overshoot of the beam spot output to the recording layer of the optical disk 10 from the objective lens 34 after focusing by using the focus error signal FEf obtained by applying high frequency phase advance compensation to the focus error signal FE using the high frequency phase advance compensation filter 511 illustrated in FIG. 5A for the zero cross judgment.

Fourth Embodiment

An optical disk recording/reproducing apparatus and method of a fourth embodiment of the present invention will be explained next by referring to FIG. 14 to FIGS. 17A to 17C.

The point of difference between the fourth embodiment and third embodiment of the present invention resides in that the timing of issuing the first deceleration pulse DECCE1 in the fourth embodiment is different from that of the third embodiment. The rest is similar to the third embodiment.

In the fourth embodiment, it is necessary to determine the levels $PI_{L1}$ to $PI_{Ln}$ of the summation signal RF at the time when the beam spot is focused to each recording layer of the optical disk in advance. The levels $PI_{L1}$ to $PI_{Ln}$ of the summation signal RF when focusing the beam spot to the individual recording layers of the optical disk in advance are measured and stored in the optical disk.

Figure 14:
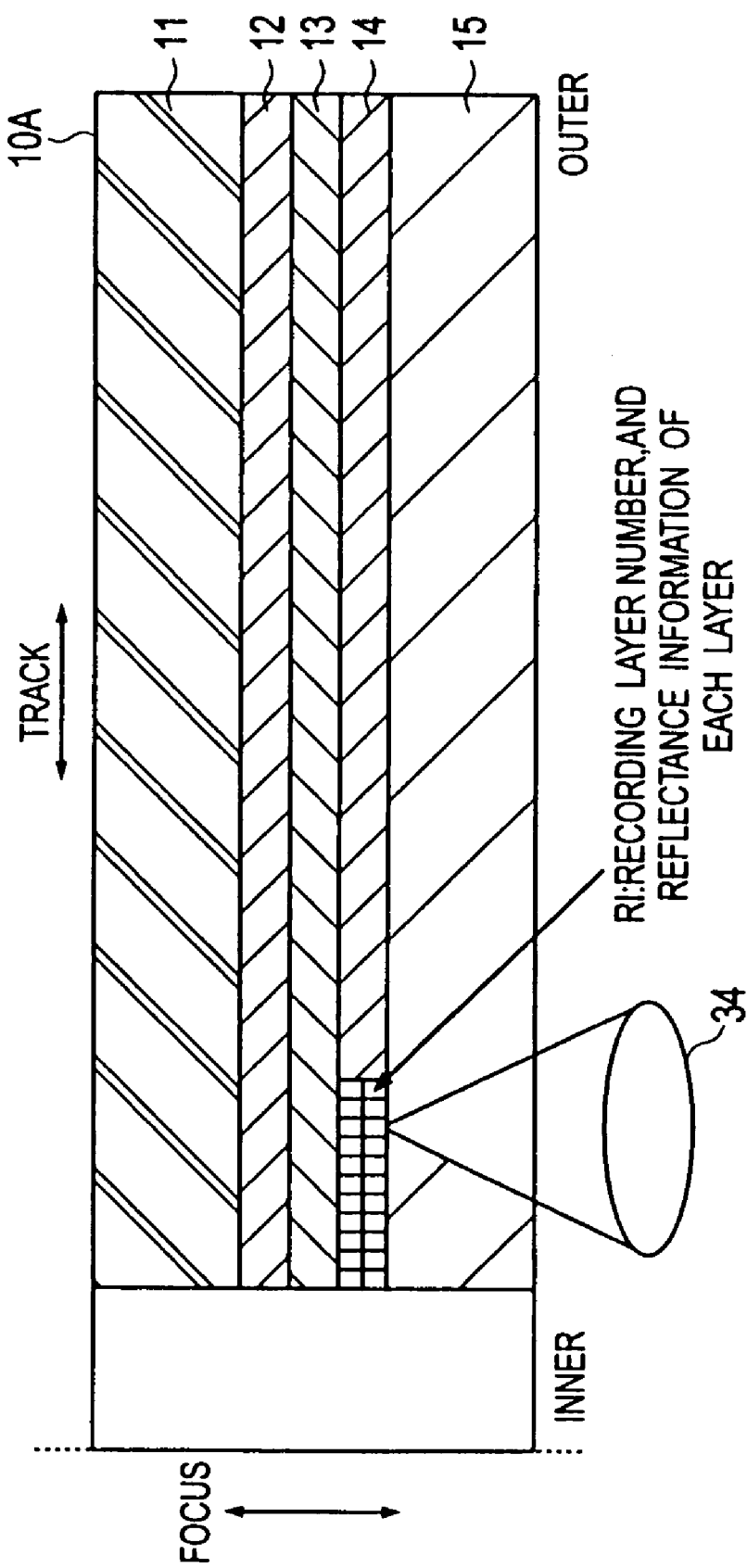
FIG. 14 is a view schematically illustrating a sectional structure of the multilayer optical disk in a fourth embodiment of the present invention.

FIG. 14 is a view schematically illustrating the sectional structure of the multilayer optical disk used in the fourth embodiment.

The optical disk 10A illustrated in FIG. 14 has three recording layers unlike the optical disk 10 having two recording layers illustrated in FIG. 5 and has a portion recording the levels PIL1 to PIL3 of the summation signal RF.

The total number of recording layers of this optical disk 10A and the reflectances of the recording layers 12 to 14 are recorded in a read-in area RI of the first recording layer 14 of the optical disk 10A. The beam spot is first focused to the first recording layer 14, the information is written from there, then recorded in the memory (not illustrated) inside the DSP 51. When the level $PI_{L1}$ of the summation signal RF of the first recording layer 14 is known, the levels $PILn=PI_{L1}×RLn/PI_{L1}$ of the summation signal RF in the second and third recording layers 13 and 12 can be calculated from the reflectance levels $PI_{L2}$ to $PI_{L3}$ of the second and third recording layers 13 and 12.

Figure 15A:
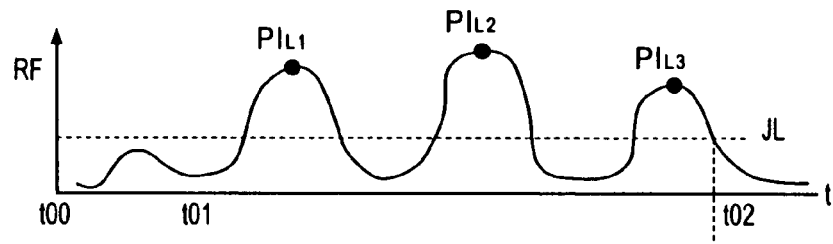
FIGS. 15A to 15B are graphs for explaining a method of calculation of the summation signal level in each recording layer of the optical disk illustrated in FIG. 14.
Figure 15B:
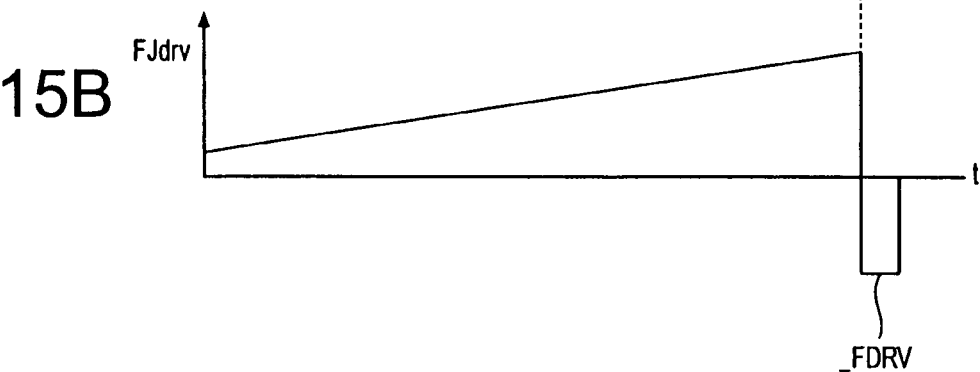

FIG. 15A is a graph explaining the method of calculation of the levels $PI_{L1}$ to $PI_{L3}$ of the summation signal RF in the recording layers 12 to 14 of the optical disk 10A obtained when giving the focus jump drive signal $FJ_{drv}$ having the constant gradient illustrated in FIG. 15 from the DSP 51 to the focus driver 56 and continuously moving the objective lens 34 in the focus direction via the coaxial actuator 35.

As shown in FIG. 15A, if the total number n of recording layers is known, it is possible to determine the level of the summation signal RF in the recording layers 12 to 14 also by bringing the objective lens 34 close to each recording layer of the optical disk 10A until number of peaks of the summation signal RF are read.

In initial steps t00 to t01, the maximum value of the summation signal RF is lower than the judgment level JL, so is ignored.

After the time t01, the maximum value of the summation signal RF exceeds the judgment level JL.

At the same time as the detection of the summation signal of the third recording layer at a time t02, the DSP 51 outputs to the focus driver 56 a negative focus drive signal BFDRV (focus jump drive signal $FJ_{drv}$ of the negative polarity) for moving the objective lens 34 away from the optical disk 10A.

In the above illustration, the total number of recording layers and the reflectance information are recorded at the first recording layer 14 of the optical disk 10A, but they can also be recorded at the other recording layers 12 and 13.

Figure 16:
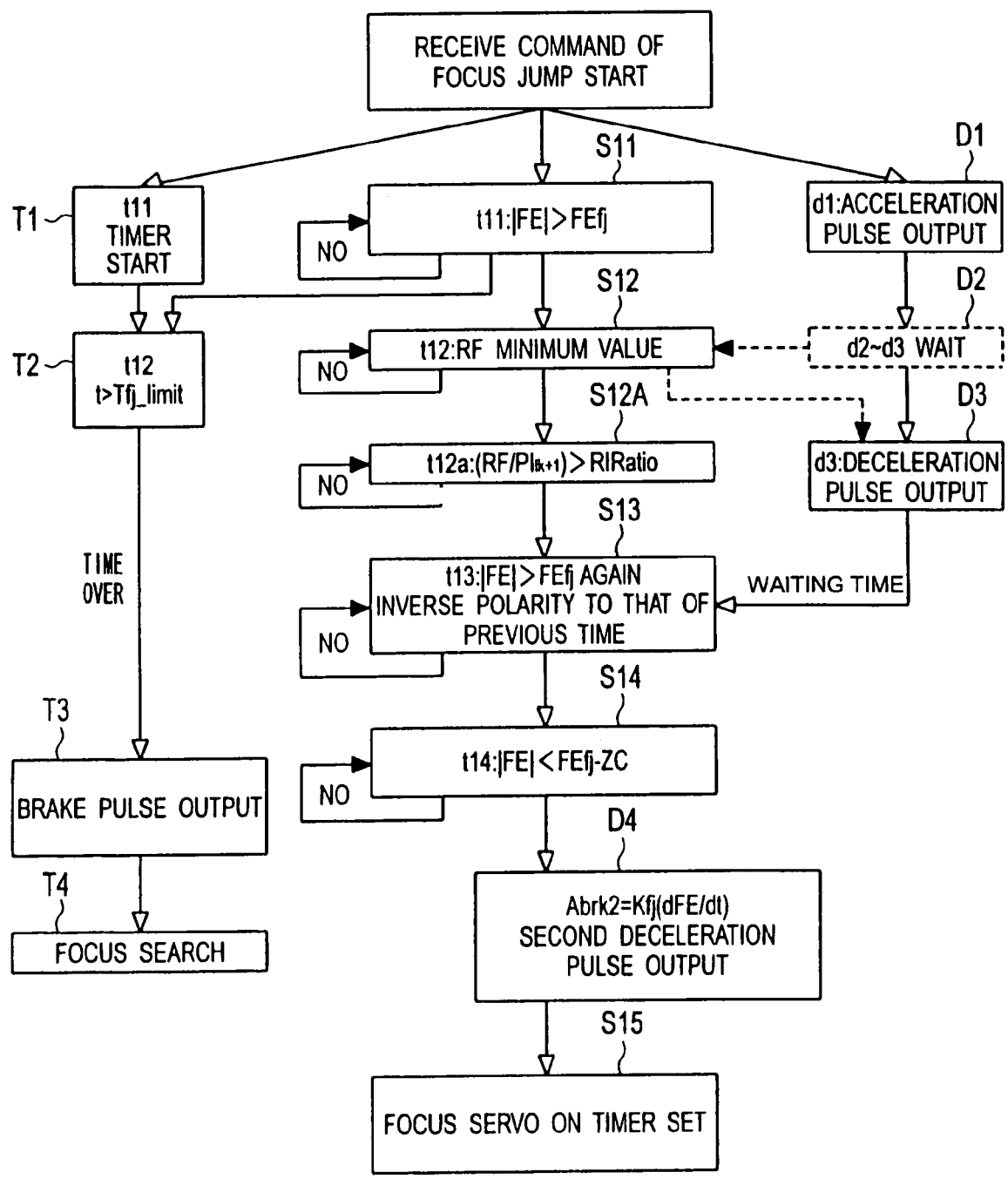
FIG. 16 is a flow chart of focus control processing of the fourth embodiment of the present invention.

FIG. 16 is a flow chart of the focus control processing from when the focus jump command is issued from the control micro-computer 60 to the DSP 51 to when the focus jump is completed in the fourth embodiment of the present invention. In FIG. 16, in the same way as FIG. 12, steps D1 to D4 show the operation of the DSP 51 for driving the coaxial actuator 35 via the focus driver 56 and moving the objective lens 34 in the focus direction, steps S11 to S15 show the monitor/decision processing by the DSP 51, and steps T1 to T4 show the timer and the timing processing by the DSP 51.

In the flow chart illustrated in FIG. 16, step 12A is added to the flow chart illustrated in FIG. 14. The rest of the processing is the same as the processing explained by referring to FIG. 12.

FIGS. 17A to 17C are waveform diagrams of the focus error signal FE (FIG. 17A), the value obtained by dividing the present summation signal RF by the level $PI_{LK+1}$ of the summation signal in the target recording layer to be focused (FIG. 17B), and the focus jump drive signal $FJ_{drv}$ (FIG. 17C) in the focus jump operation of the fourth embodiment of the present invention.

This exemplifies the case where the beam spot is focused to a k-th layer of the optical disk 10A, and the beam spot is made to jump in focus to a (k+1)-th recording layer.

At step D1, the DSP 51 serving as the focus drive controlling means gives the acceleration pulse ACCE having the amplitude $A_{acce}$ and a period $\Delta t_{drv}$ to the focus driver 56 (FIG. 17C, time d1), thereafter the DSP 51 detects a time where the summation signal RF shows the minimum value (step S12, time t12 of FIG. 17B), and then when the DSP 51 detects that the value, obtained by dividing the current summation signal RF illustrated in FIG. 17B by the level $PI_{Lk+1}$ of the summation signal RF in the target recording layer of the optical disk 10A to which the beam spot is irradiated, exceeds a threshold value PIRatio (step S12A, FIG. 17B, time t12a), the DSP 51 outputs the first deceleration pulse DECCE1 to the focus driver 56 (FIG. 17C, time d2).

Unlike the focus error signal FE, the level of the summation signal RF has a tolerance to influence of aberration, therefore at the time of a focus jump in an optical disk where the distance among the recording layers of the optical disk varies, the focus jump operation can be stabilized by using the level of this summation signal RF. Note that the procedures become complex and the format of the optical disk is limited if the level of the summation signal RF of each recording layer of the optical disk must be found in advance, therefore, both when the DSP 51 generates the first deceleration pulse DECCE1 when the level of the present summation signal RF reaches a certain threshold value and generates the first deceleration pulse DECCE1 when the level of the current summation signal RF is the minimum value (FIG. 17B, time t12), effects the same as those described above are obtained.

Other Modifications

The optical disk recording/reproducing apparatus and method of the present invention are not limited to the above embodiments.

For example, they can be realized by various circuit devices or a computer and software, not just a DSP 51, so long as they have the processing functions of the DSP 51 explained above as the embodiment of the focus jump processing means of the embodiment of the invention illustrated in FIG. 4.

In the above embodiments, cases where the optical disk recording/reproducing apparatus was configured the same as the configuration illustrated in FIG. 4 and only the processing contents of the DSP 51 were made different were explained. Accordingly, when working the above various embodiments, the processing contents of the DSP 51 may be made different.

In the above embodiments, examples where processing requiring high speed real time processing was handled by the DSP 51 and the overall processing of the optical disk recording/reproducing apparatus was left to the control micro-computer 60 were explained, but the division of the processing content of the control micro-computer 60 and the DSP 51 can be appropriately changed.

Further, it is also possible to realize the processing content of the DSP 51, for example, the phase compensation processing explained by referring to FIG. 6, by a hardware circuit.

According to the present invention, stable movement of a beam spot among the recording layers becomes possible even in an optical disk recording/reproducing apparatus using a high density writable multilayer optical disk.

In the present invention, by using the technique of outputting to the focus driver a value proportional to the differential of the focus error signal as the brake pulse, it is also possible to stabilize the focus pull-in operation.

INDUSTRIAL APPLICABILITY

The optical disk recording/reproducing apparatus and method of the present invention can be utilized as a recording apparatus in various industrial fields.

The invention claimed is:

1. An optical disk recording/reproducing apparatus for performing a focus jump operation moving a beam spot among a plurality of recording layers of a multilayer optical disk having a plurality of recording layers corresponding to a record/reproduce operation for recording data on said multilayer optical disk or reproducing data recorded on said multilayer optical disk, comprising:

an optical pick-up having an objective lens, a focus actuator for moving the objective lens in a focus direction, a beam emitting means for emitting a beam of light, a light receiving means for receiving light returned from said optical disk, and an optical system for guiding the beam of light from said beam emitting means to said objective lens and guiding the returned light from said optical disk incident upon said objective lens to said light receiving means; and a focus drive controlling means for outputting to said focus actuator a focus drive signal for moving said objective lens in the focus direction for positioning the beam spot from said objective lens to a target positioning recording layer of said multilayer optical disk when a focus jump start signal and a target positioning recording layer signal are applied and outputting a first deceleration pulse to said focus actuator by referring to a focus error signal and a summation signal obtained from returned light from said optical disk in accordance with the location of said objective lens moved in accordance with the drive of said focus actuator, wherein said focus drive controlling means outputs to said focus actuator as said focus drive signal a focus jump drive signal increasing by a certain gradient, and then outputs to said focus actuator said first deceleration pulse when said focus error signal exceeds a first threshold value, said summation signal exceeds a second threshold value, and said focus error signal crosses zero.

2. An optical disk recording/reproducing apparatus as set forth in claim 1, wherein said focus drive controlling means outputs to said focus actuator as said first deceleration pulse a deceleration pulse signal proportional to a differential of said focus error signal when said focus error signal crosses zero and corresponds to an impulse defined by a product of an amplitude and a first duration.

3. An optical disk recording/reproducing apparatus as set forth in claim 2, wherein said focus drive controlling means outputs to said focus actuator as said first deceleration pulse a deceleration pulse signal corresponding to an impulse defined by a product of an amplitude of a value of a differential of said focus error signal when said focus error signal crosses zero multiplied with a coefficient and a first duration.

4. An optical disk recording/reproducing apparatus as set forth in claim 3, wherein
said recording/reproducing apparatus has a high frequency phase advance compensation filtering means for high frequency phase advance compensation processing of said focus error signal, and
said focus drive controlling means outputs to said focus actuator said first deceleration pulse when a focus error signal compensated for phase advance by said high frequency phase advance compensation filtering means crosses zero.

5. An optical disk recording/reproducing apparatus for performing a focus jump operation moving a beam spot among a plurality of recording layers of a multilayer optical disk having a plurality of recording layers corresponding to a record/reproduce operation for recording data on said multilayer optical disk or reproducing data recorded on said multilayer optical disk, the apparatus comprising:
an optical pick-up having an objective lens, a focus actuator for moving the objective lens in a focus direction, a beam emitting means for emitting a beam of light, a light receiving means for receiving light returned from said optical disk, and an optical system for guiding the beam of light from said beam emitting means to said objective lens and guiding the returned light from said optical disk incident upon said objective lens to said light receiving means; and
a focus drive controlling means for outputting to said focus actuator a focus drive signal for moving said objective lens in the focus direction for positioning the beam spot from said objective lens to a target positioning recording layer of said multilayer optical disk when a focus jump start signal and a target positioning recording layer signal are applied and outputting a first deceleration pulse to said focus actuator by referring to a focus error signal and a summation signal obtained from returned light from said optical disk in accordance with the location of said objective lens moved in accordance with the drive of said focus actuator,
wherein said focus drive controlling means ends the focus jump operation and switches to focus servo control when a beam spot from said objective lens is positioned at the target positioning recording layer of said multilayer optical disk, and outputs to said focus actuator a second brake pulse for moving said objective lens away from said multilayer optical disk when detecting that said summation signal during said focus servo control falls below a third threshold value lower than a second threshold value.

6. An optical disk recording/reproducing method for performing a focus jump operation moving a beam spot among a plurality of recording layers of a multilayer optical disk having a plurality of recording layers corresponding to a record/reproduce operation for recording data on said multilayer optical disk or reproducing data recorded on said multilayer optical disk, the method comprising:
outputting to said focus actuator a focus drive signal increasing by a certain gradient for moving said objective lens in a focus direction for positioning the beam spot from the objective lens to a target Positioning recording layer of said multilayer optical disk when a focus jump start signal and a target positioning recording layer signal are applied;
outputting to said focus actuator a first deceleration pulse signal by referring to a focus error signal and a summation signal obtained from returned light from said optical disk in accordance with the location of said objective lens moved in accordance with the drive of said focus actuator; and
outputting to said focus actuator said first deceleration pulse signal when said focus error signal exceeds a first threshold value, said summation signal exceeds a second threshold value, and said focus error signal crosses zero.

7. An optical disk recording/reproducing method as set forth in claim 6, in which said method outputs to said focus actuator as said first deceleration pulse a deceleration pulse signal proportional to a differential of said focus error signal when said focus error signal crosses zero and corresponding to an impulse defined by a product of an amplitude and a first duration.

8. An optical disk recording/reproducing method as set forth in claim 7, in which said method outputs to said focus actuator as said first deceleration pulse a deceleration pulse signal corresponding to an impulse defined by a product of an amplitude of a value of a differential of said focus error signal when said focus error signal crosses zero multiplied with a first coefficient and said first duration.

9. An optical disk recording/reproducing method as set forth in claim 8, in which said method performs high frequency phase advance compensation processing of said focus error signal, and
outputs to said focus actuator said first deceleration pulse when a focus error signal compensated for high frequency phase advance crosses zero.

10. An optical disk recording/reproducing method for performing a focus jump operation moving a beam spot among a plurality of recording layers of a multilayer optical disk having a plurality of recording layers corresponding to a record/reproduce operation for recording data on said multilayer optical disk or reproducing data recorded on said multilayer optical disk, the method comprising:
outputting to said focus actuator a focus drive signal for moving said objective lens in a focus direction for positioning the beam spot from the objective lens to a target positioning recording layer of said multilayer optical disk when a focus jump start signal and a target positioning recording layer signal are applied;
outputting to said focus actuator a first deceleration pulse signal by referring to a focus error signal and a summation signal obtained from returned light from said optical disk in accordance with the location of said objective lens moved in accordance with the drive of said focus actuator;
switching to focus servo control when a beam spot from said objective lens is positioned at the target positioning recording layer of said multilayer optical disk; and
outputting to said focus actuator a second brake pulse for moving said objective lens away from said multilayer optical disk when detecting that said summation signal during said focus servo control falls below a third threshold value lower than a second threshold value.

* * * * *

UNITED STATES PATENT AND TRADEMARK OFFICE
CERTIFICATE OF CORRECTION

| | | |
|---|---|---|
| PATENT NO. | : 7,333,412 B2 | Page 1 of 1 |
| APPLICATION NO. | : 10/484713 | |
| DATED | : February 19, 2008 | |
| INVENTOR(S) | : Kiyoshi Manoh et al. | |

It is certified that error appears in the above-identified patent and that said Letters Patent is hereby corrected as shown below:

Column 9, line 44, delete "on the servo board 50".

Column 10, lines 3-4, change "focus error signal (RF)" to --focus error signal (FE)--.

Column 12, line 21-22, change "first brake pluse BPK1" to --first brake pulse BRK1--.

Signed and Sealed this

Ninth Day of September, 2008

JON W. DUDAS
*Director of the United States Patent and Trademark Office*